United States Patent
Montaletti et al.

(10) Patent No.: US 11,015,039 B2
(45) Date of Patent: May 25, 2021

(54) TERPOLYMER COMPOSITIONS WITH IMPROVED CLARITY AND GLOSS FOR BLOW MOLDED AND THERMOFORMED ARTICLES

(71) Applicants: Equistar Chemicals, LP, Houston, TX (US); Basell Poliolefine Italia S.r.l., Milan (IT)

(72) Inventors: Ambra Montaletti, Ferrara (IT); Roberta Marzolla, Ferrara (IT); Jean-Pierre Bideau, LeHavre (FR); Giampaolo Pellegatti, Ferrara (IT); Tim Schloemer, Cincinnati, OH (US); Tim Skillman, Maineville, OH (US)

(73) Assignees: Equistar Chemicals, LP, Houston, TX (US); Baseli Polioiefine S.r.l., Milan (IT)

( * ) Notice: Subject to any disclaimer, the term of this patent is extended or adjusted under 35 U.S.C. 154(b) by 0 days.

(21) Appl. No.: 14/821,055

(22) Filed: Aug. 7, 2015

(65) Prior Publication Data

US 2016/0046787 A1   Feb. 18, 2016

Related U.S. Application Data

(60) Provisional application No. 62/037,406, filed on Aug. 14, 2014.

(51) Int. Cl.
*C08K 5/1575* (2006.01)
*C08K 5/053* (2006.01)

(52) U.S. Cl.
CPC .......... *C08K 5/1575* (2013.01); *C08K 5/053* (2013.01)

(58) Field of Classification Search
CPC ....... C08K 5/1575; C08K 5/053; C08K 5/053
USPC ........................................................ 524/579
See application file for complete search history.

(56) References Cited

U.S. PATENT DOCUMENTS

| | | | | |
|---|---|---|---|---|
| 5,001,176 | A | * | 3/1991 | Nakazima ................ C08K 5/05 524/108 |
| 5,470,898 | A | * | 11/1995 | Syed .................... C07D 493/04 524/108 |
| 6,749,911 | B1 | * | 6/2004 | Charlier ................. C08K 5/005 264/331.17 |
| 2009/0274921 | A1 | | 11/2009 | Ackermans et al. |
| 2010/0098586 | A1 | * | 4/2010 | Lopez .................. C08K 5/0083 422/68.1 |
| 2011/0305857 | A1 | * | 12/2011 | Sun ....................... C08K 5/1515 428/35.7 |
| 2012/0288656 | A1 | | 11/2012 | Doufas |
| 2014/0005310 | A1 | * | 1/2014 | Gerster ............... C07F 9/65744 524/117 |
| 2016/0046787 | A1 | | 2/2016 | Montaletti et al. |

FOREIGN PATENT DOCUMENTS

| | | |
|---|---|---|
| EP | 0361087 A2 | 4/1990 |
| EP | 1209187 A1 | 5/2002 |
| JP | 2010242046 A | 10/2010 |
| WO | 2011159552 A1 | 12/2011 |
| WO | 2014090553 A1 | 6/2014 |

OTHER PUBLICATIONS

Database WPI Week 201075 Thomson Scientific, London, GB; AN 2010-N51266 XP002777827, JP 2010 242046 A (Japan Polychem Corp) Oct. 28, 2010 (Oct. 28, 2010).

* cited by examiner

*Primary Examiner* — Kelechi C Egwim

(57) ABSTRACT

A polymer composition and/or an article containing:
(a) a random propylene terpolymer which comprises:
 (i) 90.0-96.0 wt. %, based on the total weight of the propylene terpolymer, of propylene derived units;
 (ii) 3.0-7.0 wt. %, based on the total weight of the propylene terpolymer, of 1-butene derived units; and
 (iii) 1.0-5.0 wt. %, based on the total weight of the propylene terpolymer, of ethylene derived units; and
(b) about 0.01 to about 1.0 wt. %, based on the total weight of the propylene terpolymer, of a clarifying agent, with the balance of the polymer composition being the random propylene terpolymer and/or optionally at least one additive.

14 Claims, 9 Drawing Sheets

TERPOLYMER COMPOSITIONS WITH IMPROVED CLARITY AND GLOSS FOR BLOW MOLDED AND THERMOFORMED ARTICLES

CROSS REFERENCE TO RELATED APPLICATIONS

This application is the Non-Provisional Patent Application, which claims benefit of priority to U.S. Provisional Application No. 62/037,406, filed Aug. 14, 2014, the contents of which are incorporated herein by reference in their entirety.

FIELD OF THE INVENTION

The present disclosure relates to the field of chemistry. More specifically, the present disclosure relates to polymer chemistry. In particular, the present disclosure provides formulations and processes for random terpolymers, and random terpolymers that may be used for preparing blow molded and thermoformed articles.

BACKGROUND

Polyolefins such as polypropylene have gained a wide range of acceptance and usage in numerous commercial applications owing to their versatility, desirable properties, and general low cost for manufacture. Commercial grade polyolefins, such as polypropylene, are prepared using a variety of polymerization processes. Many industries, especially the packaging industry, utilize these polypropylene materials in a variety of processes, such as extrusion, thermoforming or blow molding, to create a variety of finished goods.

An issue of commercial importance in packaging applications is the final appearance of the packaging material, such as the clarity and gloss. Processes, such as thermoforming, employ heat and/or pressure to convert the polymeric material into the desired end-use article. Unfortunately, many polymers selected for their mechanical strength and aesthetically-appealing gloss and/or clarity may suffer a significant reduction in one or more of the gloss, clarity and/or mechanical strength areas upon processing. Accordingly, there is a need for a polymeric material capable of imparting both mechanical strength and improved optical properties upon transforming the polymeric material to an article suitable for use in packaging applications.

In addition to the transparency and/or optical clarity, stiffness is an important feature of the polymeric materials used in select product manufacture, such as bottles and the like. For example, the stiffness of a bottle is very important to bottle performance. Higher stiffness strengths allow for reduced wall thickness in the case of bottles and similar container-type products, as well as contributing to durability during the product filling process (no deterioration of the bottle). Moreover, improved stiffness leads to improved stackability of products.

Therefore, there is a need to provide a composition having select physical properties, such as high mechanical strength, gloss and high clarity while avoiding or reducing the mechanical problems often seen in articles produced from polypropylenes using thermoforming or blow molding applications, such as lower product strength and stiffness, and optical problems such as cloudiness.

BRIEF SUMMARY OF THE INVENTION

The objects described above and other advantages and features of the invention are incorporated in the application as set forth herein, and the associated drawings. In general embodiments, the present disclosure provides terpolymer compositions. In some embodiments, the present disclosure provides terpolymer compositions that are useful in the manufacture of articles of manufacture, such as packaging materials, as well as methods for the preparation of such terpolymer compositions and the associated articles. In specific embodiments, the present disclosure provides improved blown or thermoformed articles, produced from propylene-butene terpolymers, having improved mechanical properties and excellent optical properties, i.e., low haze values, balanced for specific target applications.

In one embodiment, the present disclosure provides a polymer composition comprising:
(a) a random propylene terpolymer; and
(b) a clarifying agent.

In some embodiments, the random propylene terpolymer comprises:
(i) from about 90.0 to 96.0 wt. %, based on the total weight of the propylene terpolymer, of propylene derived units;
(ii) from about 3.0 to 7.0 wt. %, based on the total weight of the propylene terpolymer, of 1-butene derived units; and
(iii) from about 1.0 to 5.0 wt. %, based on the total weight of the propylene terpolymer, of ethylene derived units.

In some embodiments, the polymer composition and/or article made therefrom includes the clarifying agent in an amount ranging from about 0.01 wt. % to about 1.0 wt. %, based on the total weight of the polymer composition.

In some embodiments, the polymer composition and/or article made therefrom includes at least one or more additives in an amount ranging from about 0.01 wt. % to about 0.5 wt. %, based on the total weight of the polymer composition.

In some embodiments, the polymer composition and/or article made therefrom has a clarity or narrow angle scatter, measured according to ASTM D 1746, from 80 to 100%.

In some embodiments, the polymer composition and/or article made therefrom has a gloss, measured at 60° according to ASTM D 2457, from 100 to 130%.

In some embodiments, the polymer composition and/or article made therefrom has an outside 60° gloss, measured according to ASTM D 2457, ranging from 90 to 130%.

In some embodiments, the polymer composition and/or article made therefrom has an inside 60° gloss, measured according to ASTM D 2457, ranging from 90 to 130%.

In some embodiments, the polymer composition and/or article made therefrom has a melt flow rate, measured according to ASTM D 1238 with 2.16 kg load at 230° C., ranging from 0.1 to 100 g/10 min.

In some embodiments, the polymer composition and/or article made therefrom has an outside 60° gloss, measured according to ASTM D 2457, ranging from 90 to 130%.

In some embodiments, the polymer composition and/or article made therefrom has a drop impact mean failure energy, measured according to ASTM D 2463-95, ranging from 10 to 30 J.

In specific embodiments, the propylene terpolymer comprises:
(i) about 91 to 93 wt. %, based upon the total weight of the propylene terpolymer, of propylene derived units;
(ii) about 4.0 to about 6.0 wt. %, based upon the total weight of the propylene terpolymer, of 1-butene derived units; and
(iii) about 2.0 to about 3.0 wt. %, based upon the total weight of the propylene terpolymer, of ethylene derived units.

In particular embodiments, the clarifying agent is present in an amount ranging from about 0.1 to about 0.5 wt. %, based on the total weight of the polymer composition.

In some embodiments, the clarifying agent is a nonitol-based compound. In particular embodiments, the clarifying agent comprises 1,2,3-trideoxy-4,6:5,7-bis-O-[(4-propylphenyl)methylene]-nonitol, or a derivative thereof.

In some embodiments, the propylene terpolymer further comprises one or more additives selected from the group consisting of alpha-nucleating agents, thermal stabilizers, extrusion processing aids, ultraviolet light stabilizers, oxidants or anti-oxidants, anti-static agents, slip agents, fire retardants, processing oils, mold release agents, and combinations thereof.

In general embodiments, the present disclosure provides an article comprising the polymer composition. In some embodiments, the article is a bottle, a container, a sheet, and/or a film. In specific embodiments, the article has a wall thickness ranging from 30 to 40 mils. In particular embodiments, article has a thickness of 1 millimeter. In some embodiments, the article is a bottle that has an empty bottle column crush top load capacity, measured according to ASTM D 2659, ranging from 600 to 1000 N.

BRIEF DESCRIPTION OF THE DRAWINGS

The following figures form part of the present specification and are included to further demonstrate certain aspects of the present invention. The invention may be better understood by making reference to one or more of these figures in combination with the detailed description of specific embodiments presented herein.

Figure 1:
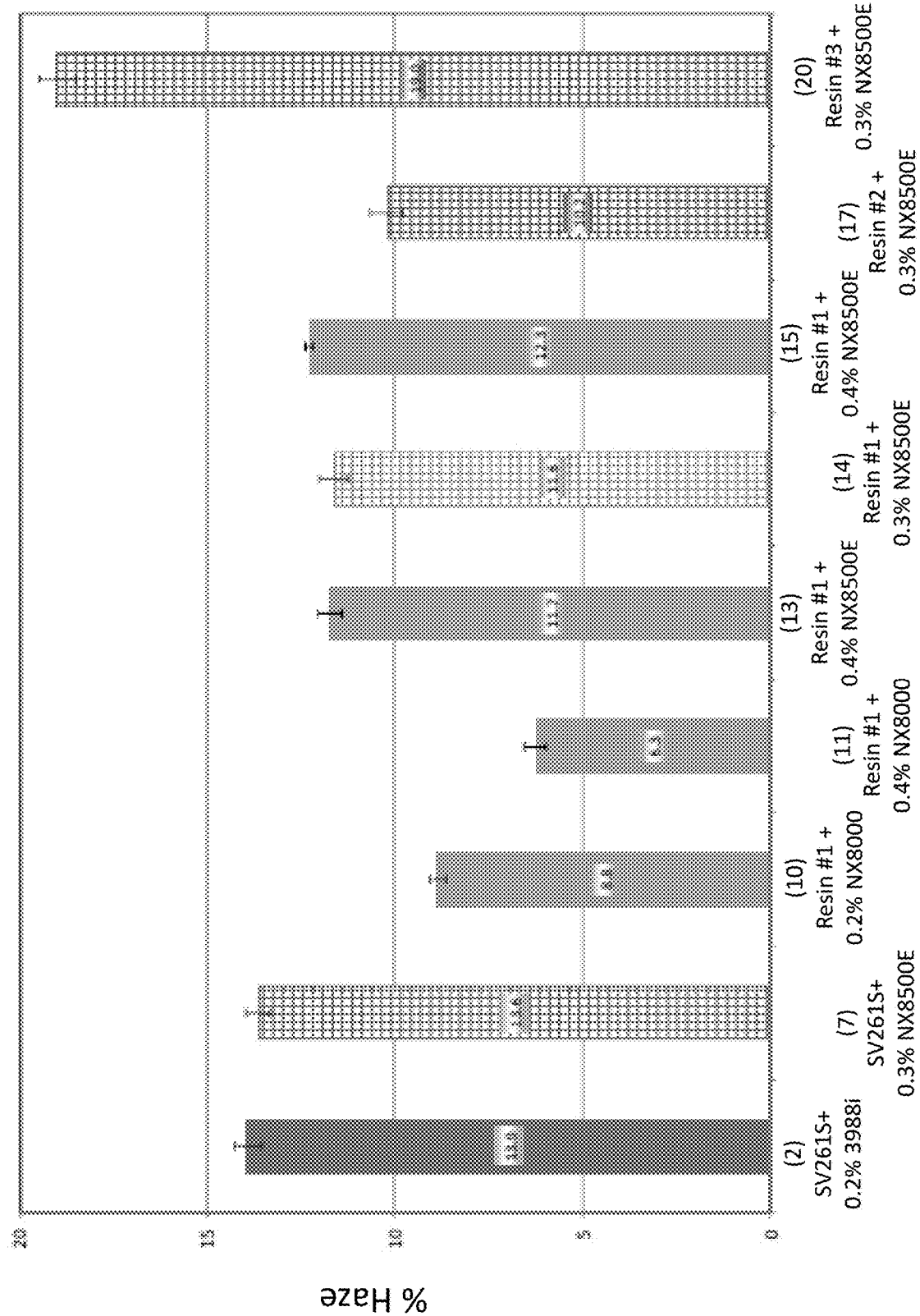
FIG. 1 illustrates the haze of select bottles formed by various clarified terpolymer resin compositions of the present disclosure.
Figure 2:
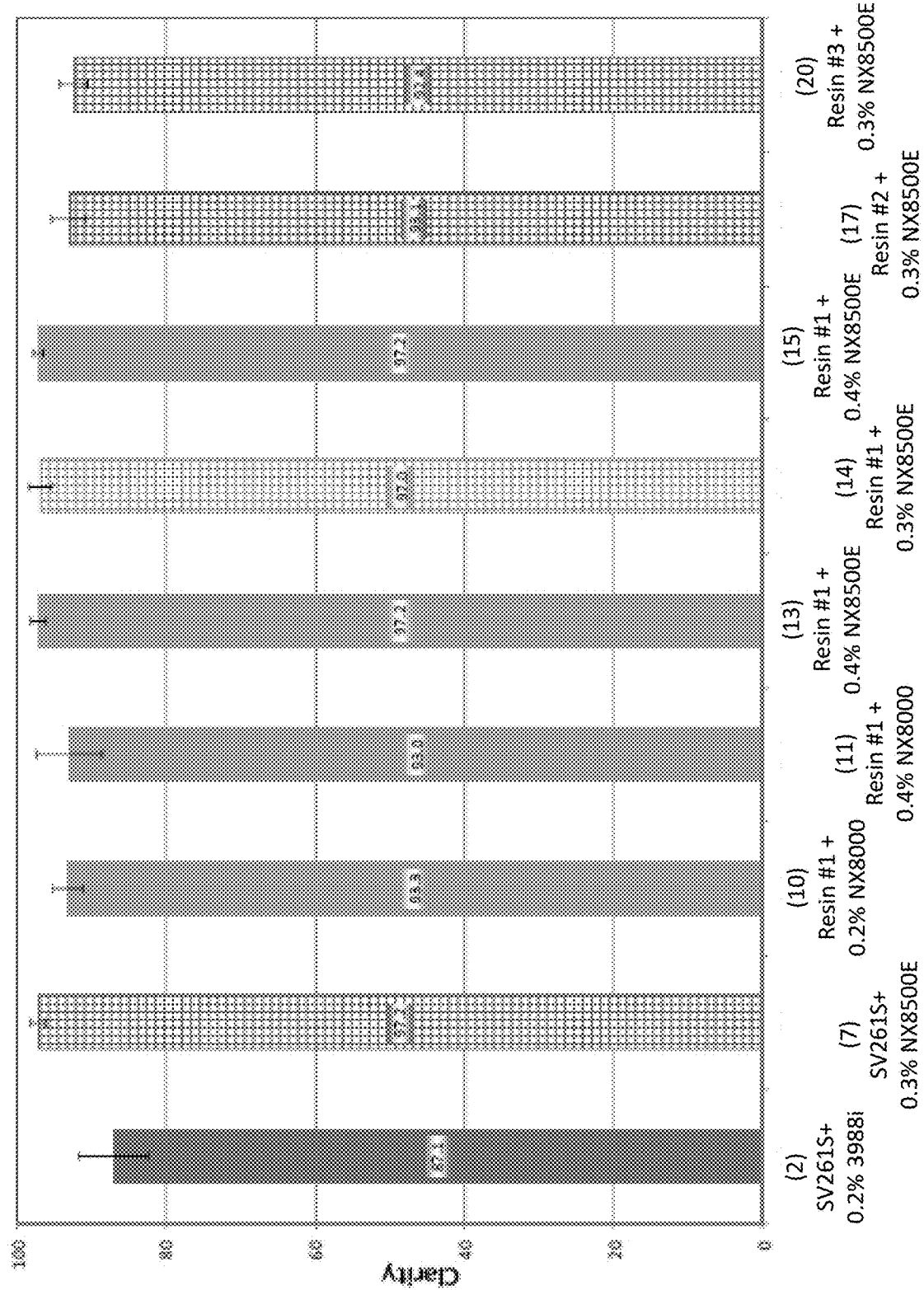
FIG. 2 illustrates the bottle clarity of select bottles formed by various clarified terpolymer resin compositions of the present disclosure.
Figure 3:
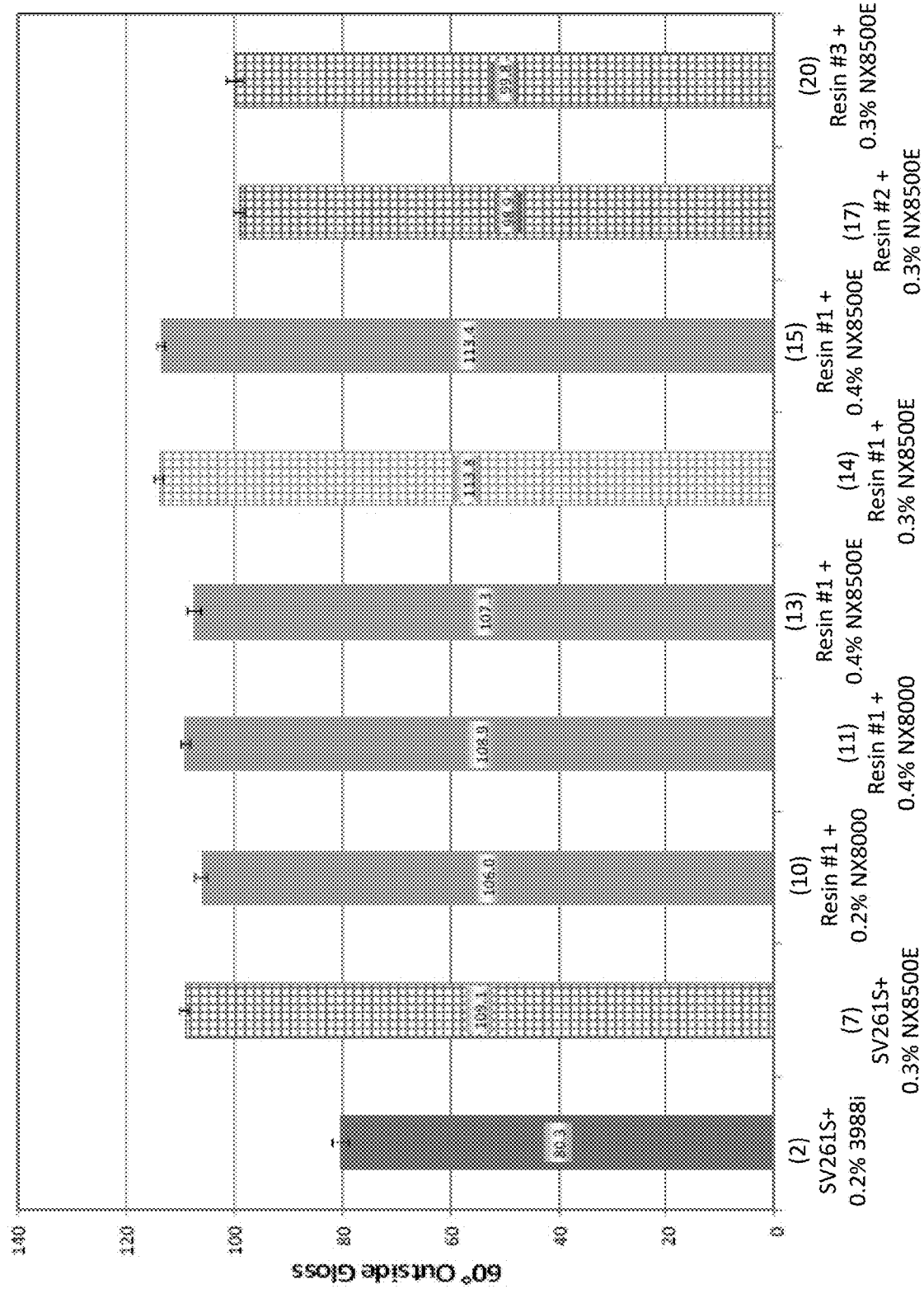
FIG. 3 illustrates the 60° outside gloss of select bottles formed by various clarified terpolymer resin compositions of the present disclosure.
Figure 4:
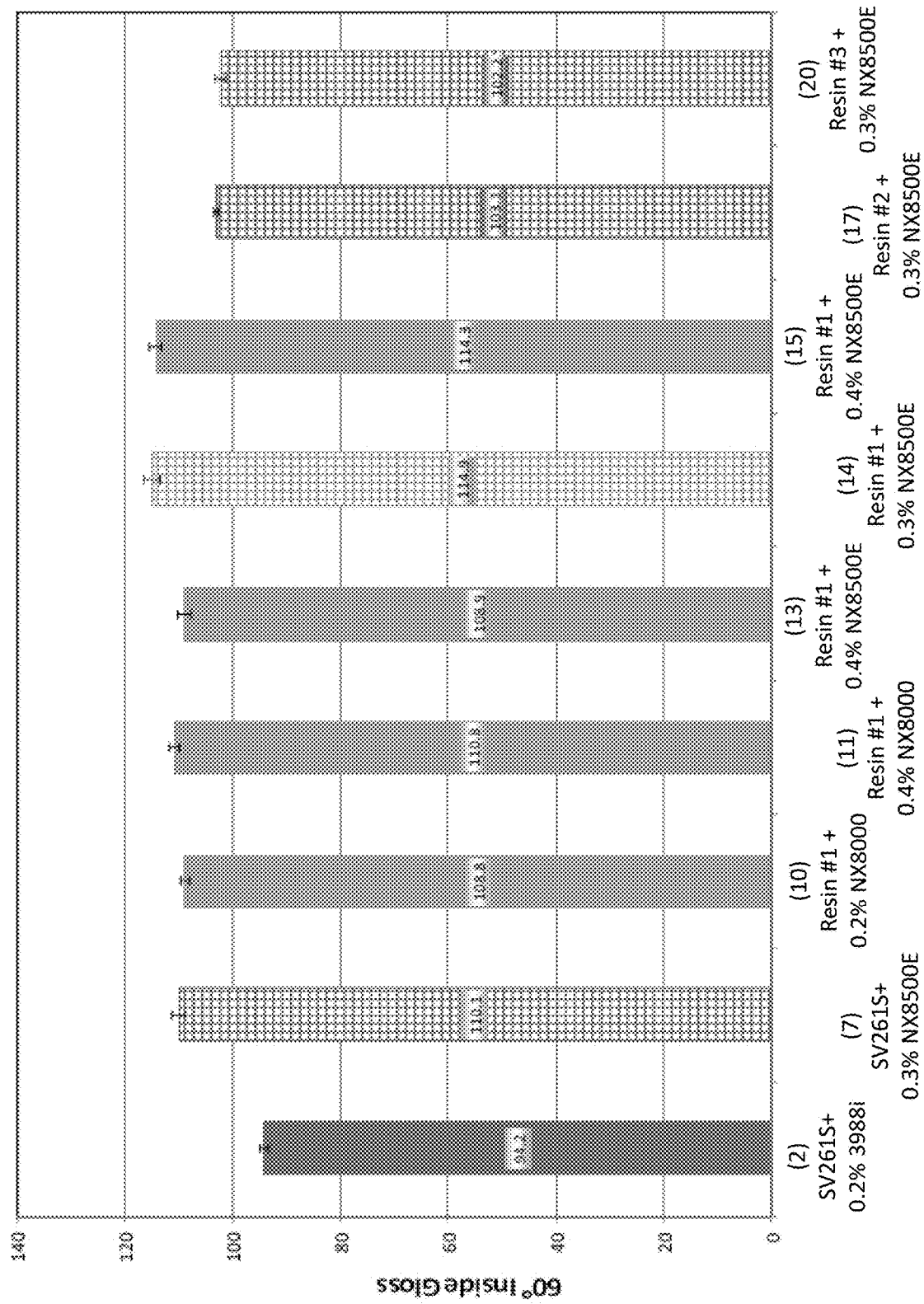
FIG. 4 illustrates the 60° inside gloss of select bottles formed by various clarified terpolymer resin compositions of the present disclosure.
Figure 5:
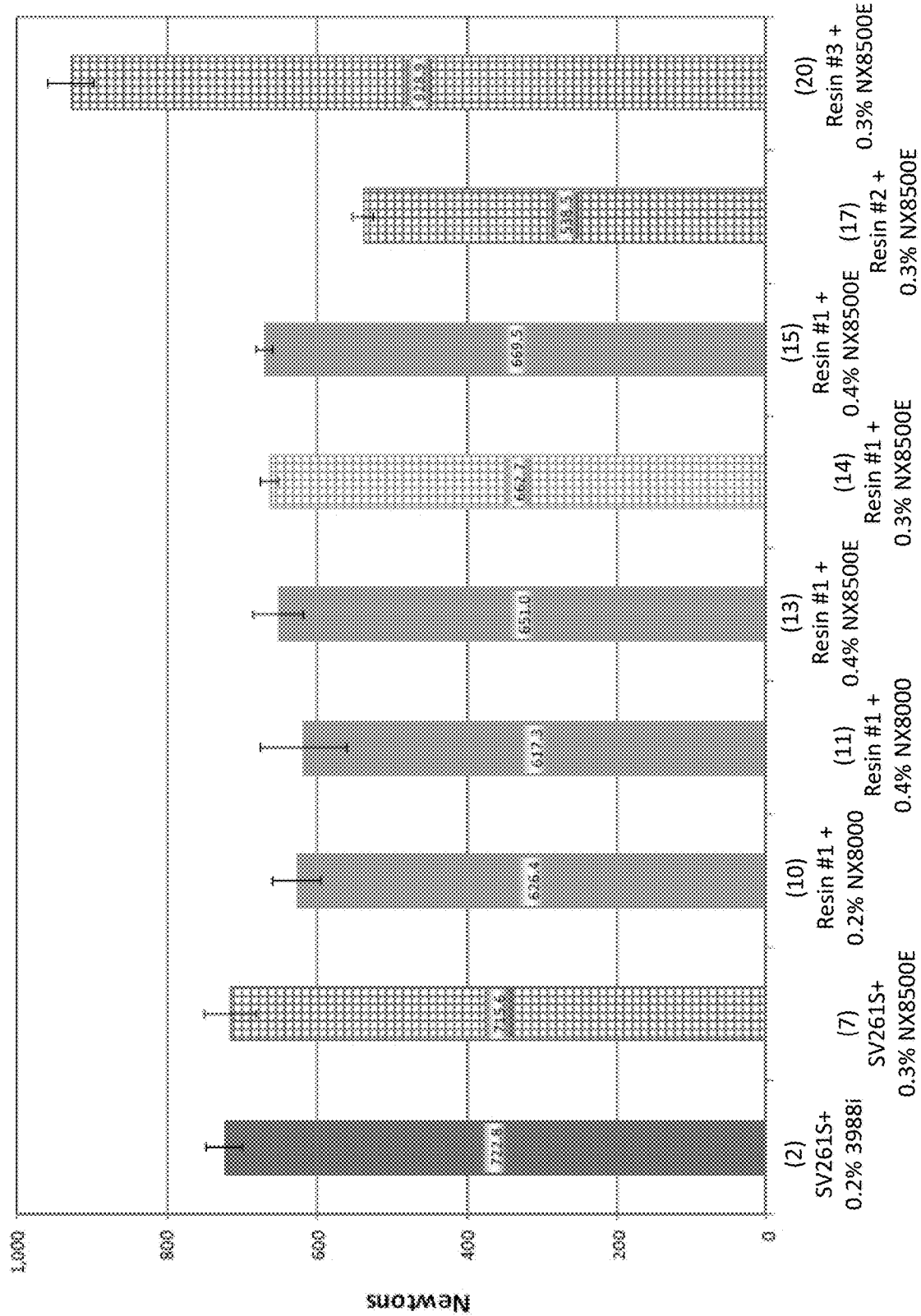
FIG. 5 illustrates the peak load of select bottles formed by various clarified terpolymer resin compositions of the present disclosure.

While the embodiments disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

Definitions

The following definitions are provided in order to aid those skilled in the art in understanding the detailed description of the present invention. Unless otherwise defined herein, scientific and technical terms used in connection with the present invention shall have the meanings that are commonly understood by those of ordinary skill in the art to which this invention belongs. Further, unless otherwise required by context, singular terms shall include pluralities and plural terms shall include the singular.

Unless explicitly stated otherwise in defined circumstances, all percentages, parts, ratios, and like amounts used herein are defined by weight.

Further in this connection, certain features of the invention which are, for clarity, described herein in the context of separate embodiments, may also be provided in combination in a single embodiment. Conversely, various features of the invention that are, for brevity, described in the context of a single embodiment, may also be provided separately or in any sub-combination.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

Further, unless expressly stated to the contrary, the conjunction "or" refers to an inclusive or and not to an exclusive or. For example, the condition "A or B" is satisfied by any one of the following: A is true (or present) and B is false (or not present), A is false (or not present) and B is true (or present), and both A and B are true (or present). Exclusive "or" is designated herein by terms such as "either A or B" and "one of A or B", for example.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

The term "contacting", as used herein, refers to the process of bringing into contact at least two distinct species such that they can react. It will be appreciated, however, that the resulting reaction product can be produced directly from a reaction between the added reagents or from an intermediate from one or more of the added reagents which can be produced in the reaction mixture.

As used herein and in the accompanying claims, the term "terpolymer" refers to polymers comprising copolymerized units resulting from copolymerization of three co-monomers. In this connection, a terpolymer may be described herein with reference to its constituent co-monomers or to the amounts of its constituent co-monomers, for example "a terpolymer comprising ethylene, propylene, and 15 weight % of 1-butene", or a similar description. Such a description may be considered informal in that it does not refer to the co-monomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a terpolymer with reference to its constituent co-monomers or to the amounts of its constituent co-monomers means that the copolymer contains copolymerized units (in the specified amounts when specified) of the specified co-monomers.

The terms "transmission" and "light transmission" and the abbreviation "LT" are synonymous and used interchangeably herein. The transmission of a material is the percentage of the total amount of light in the incident beam with which the material is illuminated ("input light") that travels through the material and, upon exiting the material, travels in a direction that has a vector component in the direction of the incident beam. The amount of transmitted light is reduced, compared to the total amount of input light, by the amount of light, if any, that is reflected, absorbed, and scattered backwards by the measured material. Transmission is measured according to ASTM Method No. D1003 (2011) using a HazeGard Plus hazemeter, available from BYK-Gardner USA of Columbia, Md.

The term "haze", as used herein, refers to the percentage of transmitted light which in passing through a material deviates from the incident beam by greater than 2.5 degrees. Haze is measured according to ASTM Method No. D1003 (2011) using a Hazegard Plus hazemeter.

The term "clarity", as used herein, is related to the percentage of transmitted light which in passing through a material deviates from the incident beam; however, the angle of the deviation is less than 2.5 degrees. Clarity is also measured using a Hazegard Plus hazemeter.

The term "stiffness", or "wall stiffness", as used herein, reflected by the top load value, which is the maximum force applied to a bottle or similar container before it starts to collapse.

Polymer Composition

The present disclosure provides a polymer composition that comprises a polymer composition comprising:
(a) a random propylene terpolymer; and
(b) a clarifying agent.

In some embodiments, the polymer composition comprises:
(a) a random propylene terpolymer which comprises:
    (i) from about 90.0 to 96.0 wt. %, based on the total weight of the propylene terpolymer, of propylene derived units,
    (ii) from about 3.0 to 7.0 wt. %, based on the total weight of the propylene terpolymer, of 1-butene derived units, and
    (iii) from about 1.0 to 5.0 wt. %, based on the total weight of the propylene terpolymer, of ethylene derived units; and
(b) about 0.01 wt. % to about 1.0 wt. %, based on the total weight of the polymer composition, of a clarifying agent, with the balance of the polymer composition being the propylene terpolymer and optionally at least one or more additive.

In some embodiments, the polymer composition and/or article made therefrom includes at least one or more additives in an amount ranging from about 0.01 wt. % to about 0.5 wt. %, based on the total weight of the polymer composition.

In some embodiments, the propylene terpolymer comprises 90 to 96 wt. %, based upon the total weight of the propylene terpolymer, of propylene derived units. The propylene terpolymer may contain from about 91 to 93 wt. %, based upon the total weight of the propylene terpolymer, of propylene derived units. The propylene terpolymer may contain 91 wt. %, based upon the total weight of the propylene terpolymer, of propylene derived units. The propylene terpolymer may contain about 92 wt. %, based upon the total weight of the propylene terpolymer, of propylene derived units. The propylene terpolymer may contain about 93 wt. %, based upon the total weight of the propylene terpolymer, of propylene derived units.

In some embodiments, the propylene terpolymer comprises about 1.0 to 9.0 wt. %, based upon the total weight of the propylene terpolymer, of 1-butene derived units. The propylene terpolymer may contain from about 3.0 to 7.0 wt. %, based upon the total weight of the propylene terpolymer, of 1-butene derived units. The propylene terpolymer may contain from about 4.0 to 6.0 wt. %, based upon the total weight of the propylene terpolymer, of 1-butene derived units. The propylene terpolymer may contain about 3.0 wt. %, based upon the total weight of the propylene terpolymer, of 1-butene derived units. The propylene terpolymer may contain about 4.0 wt. %, based upon the total weight of the propylene terpolymer, of 1-butene derived units. The propylene terpolymer may contain about 5.0 wt. %, based upon the total weight of the propylene terpolymer, of 1-butene derived units. The propylene terpolymer may contain about 6.0 wt. %, based upon the total weight of the propylene terpolymer, of 1-butene derived units. The propylene terpolymer may contain about 7.0 wt. %, based upon the total weight of the propylene terpolymer, of 1-butene derived units.

In some embodiments, the propylene terpolymer comprises about 1.0 to 5.0 wt. %, based upon the total weight of the propylene terpolymer, of ethylene derived units. The propylene terpolymer may contain from about 2.0 to 4.0 wt. %, based upon the total weight of the propylene terpolymer, of ethylene derived units. The propylene terpolymer may contain from about 2.0 to 3.0 wt. %, based upon the total weight of the propylene terpolymer, of ethylene derived units. The propylene terpolymer may contain from about 2.2 to 2.8 wt. %, based upon the total weight of the propylene terpolymer, of ethylene derived units. The propylene terpolymer may contain about 2.3 wt. %, based upon the total weight of the propylene terpolymer, of ethylene derived units. The propylene terpolymer may contain about 2.4 wt. %, based upon the total weight of the propylene terpolymer, of ethylene derived units. The propylene terpolymer may contain about 2.5 wt. %, based upon the total weight of the propylene terpolymer, of ethylene derived units. The propylene terpolymer may contain about 2.6 wt. %, based upon the total weight of the propylene terpolymer, of ethylene derived units. The propylene terpolymer may contain about 2.7 wt. %, based upon the total weight of the propylene terpolymer, of ethylene derived units. The propylene terpolymer may contain about 2.8 wt. %, based upon the total weight of the propylene terpolymer, of ethylene derived units. The propylene terpolymer may contain about 2.9 wt. %, based upon the total weight of the propylene terpolymer, of ethylene derived units. The propylene terpolymer may contain about 3.0 wt. %, based upon the total weight of the propylene terpolymer, of ethylene derived units.

Clarifying Agent

Also includable in a formulated composition of the invention's random terpolymer is a clarity-enhancing agent, also referred to equivalently herein as a clarifier are clarifying agent. Clarity-enhancing agents may enhance the aesthetic appeal of the formed product by making it more transparent (providing it with improved haze and clarity), and may be selected from two sub-groups known as nucleators and clarifiers. They may, in some instances, serve to speed production cycles and operate by nucleating the polymer crystals and increasing the rate of crystal formation in the propylene terpolymer, both of which may result in decreased average crystal size. Smaller crystals may scatter less light, which increases the clarity of the propylene terpolymer of the present invention.

One or more clarity-enhancing agents suitable for use in the formulated compositions of the invention may be selected from a variety of suitable materials that are known or used in the art. Among those categorized as clarifiers are commercially available materials sold by Milliken Chemical under the trade name MILLAD® Examples of such products suitable for use in the propylene terpolymer compositions of the present invention include MILLAD® 3988, a powdered sorbitol product; MILLAD® NX™ 8000 (1,2,3-trideoxy-4,6:5,7-bis-[(4-propylphenyl)methylene]-nonitol) and MILLAD® NX™ 8500E, both nonitol-based clarifying agents. Derivatives of dibenzylidene sorbitol (DBS) may also be employed, such as MDBS (1,3:2,4-di-p-methylbenzylidene sorbitol), EDBS, and DMDBS (bis (3,4-dimethylobenzylideno) sorbitol). Other examples include but are not limited to IRGACLEAR® DM and IRGACLEAR® XT 386 available from BASF, and ADK NA-21, an organophosphate material available from Amfine Chemical. Nucleators and clarifiers may also include ADK Na-11 and ADK Na-71 from Amfine Chemical. Nucleators may be most commonly aromatic carboxylic acid salts such as sodium benzoate. Combinations of these and/or of other clarity-enhancing agents may be used in formulations of the invention. In specific embodiments, the clarity-enhancing agent is a nonitol compound. More specifically, the nonitol-based clarifying agent is 1,2,3-trideoxy-4,6:5,7-bis-O-[(4-propylphenyl) methylene]-nonitol.

In some embodiments, the clarifying agent is present in an amount from about 0.01 wt. % to about 1.0 wt. % based on the total weight of the polymer composition. In particular embodiments, the clarifying agent is present in an amount ranging from about 500 ppm to about 5,000 ppm and/or about 0.05 wt. % to about 0.5 wt. %, based on the total weight of the polymer composition. In additional embodiments, the clarifying agent is present in an amount ranging from about 1,500 ppm to about 4,000 ppm, or about 0.1 wt. % to about 0.4 wt. %, based upon the total weight of the polymer composition. In a further embodiments, the clarifying agent may be present in an amount ranging from about 1,600 ppm to about 3500 ppm, or about 0.16 wt. % to about 0.35 wt. %. In yet another embodiment, the clarifying agent may be present in an amount ranging from about 1,700 ppm to about 2,200 ppm, or about 0.17 wt. % to about 0.22 wt. %. In particular embodiments, the clarifying agent may be present in an amount of about 1,800 ppm, about 1,900 ppm, about 2,100 ppm, about 2,200 ppm and/or 3000 ppm. These ppm figures translate to a level based on weight percentages of from about 0.05 weight percent to about 0.5 weight percent based on the total weight of the propylene terpolymer.

Additives

Following such conventional polymerization to form the propylene-ethylene-butene random terpolymer, the random terpolymer may be admixed with other formulation components to prepare a formulated composition, also called a formulation, that may be particularly useful for thermoforming and blow molding applications to generate articles for commercial use.

In some embodiments, the polymer composition contains at least one or more additives. The polymer composition may include 0.01 to 0.5 wt. %, based upon the total weight of the polymer composition, of at least one or more additives. In particular embodiments, the polymer composition may include 0.1 to 0.5 wt. %, based upon the total weight of the polymer composition, of at least one or more additives.

In general embodiments, the propylene terpolymer compositions, polymer compositions and/or articles manufactured therefrom may optionally contain one or more various additives which include, but are not limited to phenolic antioxidants, processing or thermal stabilizers; acid neutralizers; ultraviolet ("UV") light stabilizers including UV light absorbers; antistatic agents; metal deactivators; slip agents; antiblock agents; nucleating agents; lubricants and mold release agents; additives to improve extrusion processing, such as fluoropolymers; flame retardants; fillers; and/or combinations thereof. When included, the at least one or more additives are present (individually) at levels of less than 1.0 weight percent (wt. %) based on the total weight of the polymer composition. In particular embodiments, the at least one or more additives may be present in an amount less than about 0.5 wt. %, or less than about 0.01 wt. %.

Non-limiting examples of suitable additives include but are not limited to hindered phenolic antioxidants (such as IRGANOX® 1010, IRGANOX® 1076, ETHANOX® 330); phosphite antioxidants (such as IRGAFOS® 168 and ULTRANOX® 626); phosphonite antioxidants (such as SANDOSTAB P-EPQ); acid neutralizers (such as calcium stearate, hydrotalcite DHT-4A which is magnesium aluminum hydroxy-carbonate hydrate); ultraviolet ("UV") light stabilizers (such as Chimassorb 944, Tinuvin 622, and Cyasorb UV 2908), nucleating agents (such as sodium benzoate); antistatic agents (such as glyceryl mono-stearate and ethoxylated amines); slip agents (such as erucamide, oleamide, behenamide); antiblock agents (such as silica); and fillers (such as calcium carbonate, talc, and wollastonite). These optional additives are described in more detail below.

One potential formulation component additive may be a thermal stabilizer. Such an additive helps to protect the propylene terpolymer from degradation due to exposure to excessive temperatures. Examples of such include, but are not limited to, pentaerythritol tetrakis(3,5-di-tert-butyl-4-hydroxyhydrocinnamate), which is commercially available from Ciba Specialty Chemicals Corporation (Tarrytown, N.Y.) under the tradename CIBA® IRGANOX® 1010, and tris(2,4-di-tert-butylphenyl)phosphite, which is commercially available from the same company under the tradename CIBA® IRGAFOS® 168. Modified calcium salts derived from stearic and lactic acids may also be employed for purposes of thermal stability, and may include the products called PATIONIC® 940 and PATIONIC® 1052, available from American Ingredients Company (Kansas City, Mo.). Other suitable thermal stabilizers known or used in the art may also or alternatively be selected as appropriate.

The polymer compositions described herein may further and optionally include one or more alpha-nucleating (α-nucleating) agents. Suitable alpha-nucleating agents include, but are not limited to, nucleating agents, such as those described for example by Blomenhofer, et al. [*Macromolecules*, Vol. 38 (9), pp. 3688-3695 (2005)].

Non-limiting examples of alpha-nucleating agents include but are not limited to: (i) salts of monocarboxylic acids and polycarboxylic acids, e.g. sodium benzoate or aluminum tert-butylbenzoate, and (ii) dibenzylidenesorbitol (e.g. 1,3: 2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4-di(methylbenzylidene)sorbitol), nonitol,1,2,3, -trideoxy-4,6:5,7-bis-O-[(4-propylphenyl)methylene]-nonitol-, and (iii) salts of diesters of phosphoric acid, e.g. sodium 2,2'-methylenebis(4,6,-di-tert-butylphenyl)phosphate or aluminium-hydroxy-bis[2,2'-methylene-bis(4,6-di-t-butylphenyl)phosphate], and (iv) vinylcycloalkane polymers and vinylalkane polymers. Such additives are generally commercially available and are described, for example, in *Plastics Additives Handbook*, 5th Edition [Hans Zweifel, Ed., Hanser Gardner Publications, Inc., Cincinnati (2000)].

The polymer composition may contain up to about 5 wt. % of a nucleating agent. In a particular embodiment, the propylene terpolymer composition may contain from about 0.01 wt. % to about 5.0 wt. %, or from about 0.02 wt. % to about 0.50 wt. %, of an alpha-nucleating agent. The alpha-nucleating agent may be dibenzylidenesorbitol (e.g. 1,3:2,4 dibenzylidene sorbitol) or a dibenzylidenesorbitol derivative, dimethyldibenzylidenesorbitol (e.g. 1,3:2,4 di(methylbenzylidene) sorbitol) and/or nonitol,1,2,3,-trideoxy-4,6:5, 7-bis-O-[(4-propylphenyl)methylene]-nonitol- or an analog or derivative thereof, or other similar nonitol compounds, such as those commercially available as MILLAD® NX™ 3988i [CAS No. 135861-56-2], MILLAD® NX™ 8000 [CAS No. 882073-43-0] or NX™ 8500E, all available from Milliken Chemical (Spartanburg, S.C.). In the case that the α-nucleator is a nonitol compound, the α-nucleator functions as both a nucleating agent and a clarifying agent in the polymer composition.

Further suitable alpha-nucleating agents are polymeric nucleating agents selected from the group consisting of vinylcycloalkane polymers and vinylalkane polymers. Nucleation with these polymeric nucleating agents is either accomplished by a special reactor technique, where the catalyst is pre-polymerized with monomers like e.g. vinylalkane polymers, such as vinylcyclohexane (VCH), or by blending the propylene terpolymer with the vinyl(cyclo) alkane polymer.

Other exemplary nucleating agents including but are not limited to ADK STAB NA-11 (2,4,8,10-tetra(tert-butyl)-6-hydroxy-12H-dibenzo[d,g][1,3,2]-dioxaphosphocin-6-oxide, sodium salt; sodium 2,2'-methylene-bis-(4,6-di-tert-butylphenyl) and ADK STAB NA-21 (the main component of which is aluminum hydroxy-bis[2,2'-methylenebis[4,6-di-(tert-butyl)phenyl]phosphate, CAS No. 151841-65-5]), both of which are commercially available from Asahi-Denka Kogyo KK/Adeka Corporation (Tokyo, Japan) and are suitable for use as optional additives.

Antioxidants suitable for use as additives in the propylene terpolymer compositions of the present invention are sterically-hindered phenolic antioxidants, such as 2-tert-butyl-4, 6-dimethylphenol, 2,6-di-tert-butyl-4-methyl-phenol, 2,6-di-tert-butyl-4-isoamylphenol, 2,6-di-tert-butyl-4-ethylphenol, 2-tert-butyl-4,6-diisopropyl-phenyl, 2,6-dicyclopentyl-4-methylphenol, 2,6-di-tert-butyl-4-methoxymethylphenol, 2-tert-butyl-4,6-dioctadecylphenol, 2,5-di-tert-butylhydroquinone, 2,6-di-tert-butyl-4,4-hexadecyloxyphenol, 2,2'-methylene-bis(6-tert-butyl-4-methylphenol), 4,4'-thio-bis-(6-tert-butyl-2-methylphenol), 2,2'-thiodiethylenebis-(3,5-di-tert-butyl-4-hydroxyphenyl)-propionate, octadecyl-3-(3,5-di-tert-butyl-4-hydroxyphenyl)propionate, 1,3,5-trimethyl-2,4,6-tris(3',5'-di-tert-butyl-4-hydroxy-benzyl)benzene, 2,5,7,8-tetramethyl-2(4', 8',12'-trimethylthdecyl)-chroman-6-ol and pentaerythrityl-tetrakis-3-(3,5-di-tert-butyl-4-hydroxy-phenyl)propionate. Antioxidants which are commercially available include, for example, those from Ciba Specialty Chemicals Corporation (Tarrytown, N.Y.) sold under the tradename CIBA®, including but not limited to IRGANOX® 1010, IRGANOX® 1330, IRGANOX® 1076, IRGANOX® 1035, IRGANOX® E201, and the like.

Stabilizers suitable for use as additives include phosphite based stabilizers, such as tris-(2,4-di-tert-butylphenyl)-phosphite), bis(2,4-di-tert-butylphenyl)-pentaerythrityl-di-phosphite, bis(2,4-dicumylphenyl)pentaerythritol diphosphite, and similar compounds. Exemplary, commercially available stabilizers suitable for use in the compositions of the present invention include but are not limited those from Ciba Specialty Chemicals Corporation (Tarrytown, N.Y.) sold under the tradename IRGAFOS®, such as IRGAFOS® 168 and IRGAFOS® 126, or those available from Dover Chemical Corporation (Dover, Ohio), such as DOVERPHOS® S-9228 and DOVERPHOS® S-9411.

Acid neutralizing agents and/or lubricants that are suitable for use as additives include both water-soluble and water-insoluble acid neutralizers. Examples of water-soluble acid neutralizers include, but are not limited to, meglumine, sodium bicarbonate, sodium carbonate, sodium citrate, calcium gluconate, di.sodium hydrogen phosphate, dipotasium hydrogen phosphate, tripotasium phosphate, sodium tartarate, sodium acetate, calcium glycerophosphate, and preferably tromethamine, or any combination of the foregoing. Examples of water-insoluble acid neutralizers include, but are not limited to magnesium hydroxide, aluminum hydroxide, dihydroxy aluminum sodium carbonate, calcium carbonate, aluminum phosphate, aluminum carbonate, dihydroxy aluminum amino acetate, magnesium oxide, magnesium trisilicate, magnesium carbonate, and combinations of the foregoing. In accordance with select aspects of the present invention, the acid neutralizers are water-soluble acid neutralizers, particularly for carboxylic acid metal salts (carboxylates), where the metal is selected from Group 1 or Group 2 of the Periodic Table of the Elements, or from the transition metals, such as zinc. Exemplary carboxylates include, but are not limited to, lithium stearate, potassium stearate, calcium stearate, magnesium stearate, calcium-myristate, lithium myristate, magnesium myristate, sodium myristate, potassium myristate, calcium 12-hydroxy stearate, magnesium 12-hydroxy stearate, calcium palmitate, calcium laurate, magnesium palmitate, magnesium laurate and zinc stearate. Additionally, zeolite structures (such as hydrotalcite [magnesium aluminum hydroxycarbonate hydrate; DHT 4], both natural and synthetic), magnesium oxide or zinc oxide can also be used as acid neutralizers.

UV light absorbing agents suitable for use as additives UV light as used herein includes UVA, UVB, or UVC light alone or in combination with another type of UV light. Suitable UV light absorbers include without limitation substituted benzophenones, such as 2-hydroxybenzophenone, 2-(2-hydroxyphenyl)-benzotriazoles, substituted 2-hydroxybenzophenones, benzotriazoles such as 2-hydroxy-5-acryloxyphenyl-2H-benzotriazole, 2-(3'-methallyl-2'-hydroxy-5'-methyl phenyl) benzotriazole, or allyl hydroxymethylphenyl benzotriazole, and triazines. Exemplary triazines useful as optional additives in accordance with the present invention include, but are not limited to CHEMSORB® LS-1164, known as [2-(4,6-bis-(2,4-dimethylphenyl)-1,3,5-triazin-2-yl)-5-(octyloxy)-phenol].

Useful antistatic agents include glyceryl monostearate ("GMS"), ethoxylated amines, and others, including mixtures thereof.

Slip agents suitable for use as additives include, but are not limited to, erucamide, oleamide, behenamide, erucyl erucamide, and others, and mixtures thereof.

Antiblock agents that can be included in the additive blend include but are not limited to synthetic or natural silica, sodium calcium alumino-silicate, and others, including mixtures thereof.

Compaction aids that can optionally accompany the propylene terpolymer composition include metallic silicates, montmorillonite clay, silica, calcium carbonate, barium sulfate, titanium dioxide, zinc oxide, and mixtures thereof.

Metallic silicates useful as compaction aid additives should preferably have a melting point in above 250° C. Metallic silicates useful as compaction aid additives include, but are not limited to, potassium magnesium alumino-silicates, sodium calcium alumino-silicates, anhydrous aluminum silicates, sodium potassium alumino-silicates, calcium silicates, hydrated magnesium silicates, such as talc, sodium alumino-silicates synthetic magnesium sodium lithium fluoro-silicate, synthetic magnesium sodium lithium phosphated fluoro-silicate, or mixtures thereof.

The potassium magnesium alumino-silicates can be phlogopite mica, Muscovite mica, or mixtures thereof. The montomorrillonite clay used as a compaction aid can further, optionally be modified with a quaternary ammonium salt.

Titanium dioxide may be used as a compaction aid. In some embodiments, the titanium dioxide can also be coated with a metallic stearate, such as calcium stearate, magnesium stearate, or zinc stearate. In addition, the compaction aid can be a mixture of titanium dioxide and mica, either phlogopite or Muscovite. If such a mixture is used, then the titanium dioxide should preferably be present at about 0.5% to about 10% by weight of the additive blend, and the mica should be present at about 0.5% to about 10% of the additive blend. The compaction aids can also include synthetic amorphous silica, present at about 0.5% to about 20% by weight of the additive blend, preferably 3 to 10% of the additive blend.

A variety of processes may be employed to prepare the propylene terpolymer compositions described herein. The equipment, process conditions, catalysts, additives and other materials will, of course, vary in a given process, depending on the desired composition and properties of the propylene terpolymer being formed. Select of these catalysts, additives, equipment and process conditions will be described below in broad detail.

Catalyst Systems

Catalyst systems useful for forming the propylene terpolymers of the present invention include any suitable catalyst system. For example, the catalyst system may include chromium based catalyst systems, single site transition metal catalyst systems including metallocene catalyst systems, Ziegler-Natta catalyst systems or combinations thereof. Exemplary processes include, but are not limited to, the Spheripol, and Spherizone polymer processes and related technologies, as well as the Catalloy process. The catalysts may be activated for subsequent polymerization and may or may not be associated with a support material, for example. A brief discussion of such catalyst systems is included below, but is in no way intended to limit the scope of the invention to such catalysts.

For example, Ziegler-Natta catalyst systems are generally formed from the combination of a metal component (e.g., a catalyst) with one or more additional components, such as a catalyst support, a cocatalyst and/or one or more electron donors. Ziegler-Natta catalysts may be stereospecific or not. In accordance with select aspects of the present invention, the Ziegler-Natta catalyst is a high-yield Ziegler-Natta catalyst (a catalyst of the fourth- and fifth-generation type, to differentiate it from low yield, second-generation Ziegler-Natta catalysts). An exemplary, non-limiting suitable Ziegler-Natta catalyst to be employed in accordance with the present invention comprises a catalyst component (optionally a vinyl-modified catalyst component), a co-catalyst component, and at least one electron donor (internal and/or external electron donor). A non-limiting example of such as catalyst is one where the catalyst is a Ti-Mg-based catalyst component, and the co-catalyst is an aluminum-based compound.

Metallocene catalysts may be characterized generally as coordination compounds incorporating one or more cyclopentadienyl (Cp) groups (which may be substituted or unsubstituted, each substitution being the same or different) coordinated with a transition metal through it-bonding. The substituent groups on Cp may be linear, branched or cyclic hydrocarbyl radicals, for example. The cyclic hydrocarbyl radicals may further form other contiguous ring structures, including indenyl, azulenyl and fluorenyl groups, for example. These contiguous ring structures may also be substituted or unsubstituted by hydrocarbyl radicals, such as $C_1$ to $C_{20}$ hydrocarbyl radicals, for example. Any metallocene catalyst capable of catalyzing the formation of a propylene/butene/ethylene terpolymer can be used here, typically as a single-site catalyst.

The catalysts used in the preparation of the propylene terpolymer compositions described herein may be supported or unsupported. Support materials may include, but are not limited to magnesium chloride ($MgCl_2$). Specific inorganic oxides include but are not limited to silica, alumina, magnesia, titania and zirconia.

To prepare a polymer such as the propylene terpolymer compositions of the present invention, it is necessary, in general, to contact the catalyst, the monomer or mixture of monomers and the given and the described cocatalyst(s), when necessary. In certain cases, it is desirable that the catalyst has been preactivated. Those skilled in the art will understand that this refers to subjecting the catalyst to conditions that promote the desired interaction between the activator or cocatalyst and the catalyst itself.

The catalyst systems described herein may be used over a wide range of temperatures and pressures. The temperatures may be in the range of from about 20° C. to about 280° C., or from about 50° C. to about 200° C., inclusive, and the pressures employed may be in the range of from about 1 atmosphere to about 500 atmospheres or higher. The polymerization processes include solution, bulk, gas phase, slurry phase, high pressure processes, and combinations thereof.

Embodiments of the present invention generally utilize Ziegler-Natta type catalyst systems to form the propylene terpolymer compositions described herein using the monomers ethylene, propylene and 1-butene, although metallocene catalyst systems may be used as well as appropriate and with similar results.

Polymerization Processes

Terpolymer polymerizations in accordance with the present invention may be carried out in, for example, loop reactors, slurry reactors, continuous or simple batch stirred tank reactors, gas phase reactors, or other types of polymerization reactors which enable introduction and appropriate mixing of monomer feedstocks, operating in bulk or slurry and in which the propylene terpolymer product forms in particulate form. "Bulk", as used in reference to a reactor, means a polymerization in a reaction medium that comprises at least 60 wt. % monomer. Reaction conditions, including time, temperature, pressure, and residence profile, may be any known or used in the art. Agitation or mixing may be accomplished using any conventional stirring or circulating means to ensure appropriate contact between the monomers and the catalyst. It is also possible to use several reactors of each type, e.g., one loop reactor and two or three gas phase reactors, in series. The term "gas phase reactor" as used herein refers to any mechanically mixed or fluid bed reactor.

One non-limiting example of a gas phase polymerization process generally employs a continuous cycle, wherein a cycling gas stream (otherwise known as a recycle stream or fluidizing medium) is heated in a reactor by heat of polymerization. The heat is removed from the recycle stream in another part of the cycle by a cooling system external to the reactor. The gaseous stream containing one or more monomers may be continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer.

The reactor pressure in a gas phase process may vary from about 100 psig to about 500 psig, or from about 200 to about 400 psig, or from about 250 to about 350 psig. The reactor temperature in a gas phase process may vary from about 30° C. to about 120° C., or from about 60° C. to about 115° C., or from about 70° C. to about 110° C., inclusive.

Slurry processes generally include forming a suspension of solid, particulate polymer in a liquid polymerization medium, to which monomers and optionally hydrogen, along with catalyst, are added. The suspension, including the polymerization diluent, may be intermittently or continuously removed from the reactor where the volatile components may be separated from the polymer and recycled, optionally after a distillation, to the reactor. The liquefied diluent employed in the polymerization medium may a hydrocarbon having from 3 to 7 carbon atoms. The medium employed should be liquid under the conditions of polymerization and relatively inert.

The catalyst may be injected regularly to the reactor loop, which can itself be filled with circulating slurry of growing polymer particles in a monomer. Hydrogen, optionally, may be added as a molecular weight control. The reactor may be maintained at a pressure of from about 27 bar (2.7 mPa) to about 45 bar (4.5 mPa) and a temperature of from about 30° C. to about 120° C. Reaction heat can be removed through the loop wall since much of the reactor is in the form of a double-jacketed pipe. The slurry may exit the reactor at regular intervals or continuously to a heated low pressure flash vessel, rotary dryer and a nitrogen purge column in sequence for removal of unreacted monomer and comonomers. The resulted hydrocarbon free powder can then be compounded for use in various applications. Alternatively, other types of slurry polymerization processes can be used, such stirred reactors is series, parallel or combinations thereof.

A slurry and/or polymerization process generally includes pressures in the range of 1 to 50 atmospheres (0.10 to 5.06 mPa) and even greater, and temperatures ranging from about 30° C. to about 120° C.

Polypropylene Terpolymer

The propylene terpolymers (and blends thereof) formed via the processes described herein, and thereafter produced into end-use articles, exhibit a number of unique characteristics, as set forth below.

In some embodiments, the polymer composition and/or article made therefrom has thickness ranging from 0.1 to 1.5 millimeters, or from 4 to 60 mils. In specific embodiments, the polymer composition and/or article made therefrom has thickness ranging from about 30 to 40 mils. The polymer composition and/or article made therefrom may have a thickness of about 35 mils.

In some embodiments, the polymer composition and/or article made therefrom has a haze ranging from 0 to 20%, measured according to ASTM D 1003-11 using a sample having a thickness of about 1 millimeter or about 30 to 40 mils. The polymer composition and/or article made therefrom may have a haze of less than 15%. In some examples, the polymer composition and/or article made therefrom may have a haze ranging from 0 to 12% when the test is performed using a 35 mil bottle. In some examples, the polymer composition and/or article made therefrom may have a haze ranging from 4 to 10% when the test is performed using a 35 mil bottle.

The term "ASTM D 1003-11" or "ASTM D 1003" as used herein refers to the standard test method for determining the haze and luminous transmittance of transparent plastics. In general, this test method covers the evaluation of specific light-transmitting and wide-angle-light-scattering properties of planar sections of materials such as essentially transparent plastic. Light that is scattered upon passing through a film or sheet of a material can produce a hazy or smoky field when objects are viewed through the material. Another effect can be veiling glare, as occurs in an automobile windshield when driving into the sun. According to this method, the haze measurements are made with either a hazemeter or a spectrophotometer. This test method was approved on Apr. 15, 2011 and published April 2011, the contents of which are incorporated herein by reference in its entirety. For the referenced ASTM standards, visit the ASTM website, www.astm.org, or contact ASTM Customer Service at service@astm.org.

In some embodiments, the polymer composition and/or article made therefrom has a clarity or narrow angle scatter, measured according to ASTM D 1746, from 80 to 100%. The polymer composition and/or article made therefrom may have a narrow angle scatter ranging from 85 to 100%, measured on a 35 mil bottle. The polymer composition and/or article made therefrom may have a narrow angle scatter ranging from 93 to 100%, measured on a 35 mil bottle.

The term "ASTM D 1746" as used herein refers to the standard test method for determining transparency of plastic sheeting. The attribute of clarity of a sheet, measured by its ability to transmit image-forming light, correlates with its regular transmittance. Sensitivity to differences improves with decreasing incident beam- and receptor-angle. If the angular width of the incident beam and of the receptor aperture (as seen from the specimen position) are of the order of 0.1° or less, sheeting of commercial interest have a range of transparency of about 10 to 90% as measured by this test. Results obtained by the use of this test method are greatly influenced by the design parameters of the instruments; for example, the resolution is largely determined by the angular width of the receptor aperture. Caution should therefore be exercised in comparing results obtained from different instruments, especially for samples with low regular transmittance. Regular transmittance data in accordance with this test method correlate with the property commonly known as "see-through," which is rated subjectively by the effect of a hand-held specimen on an observer's ability to distinguish clearly a relatively distant target. This correlation is poor for highly diffusing materials because of interference of scattered light in the visual test. This test method was approved on Feb. 1, 2009 and published March 2009, the contents of which are incorporated herein by reference in its entirety. For the referenced ASTM standards, visit the ASTM website, www.astm.org, or contact ASTM Customer Service at service@astm.org.

In some embodiments, the polymer composition and/or article made therefrom has a gloss, measured at 60° according to ASTM D 2457, from 100 to 130%.

In some embodiments, the polymer composition and/or article made therefrom has an outside 60° gloss, measured according to ASTM D 2457, ranging from 90 to 130%.

In some embodiments, the polymer composition and/or article made therefrom has an inside 60° gloss, measured according to ASTM D 2457, ranging from 90 to 130%.

The term "ASTM D 2457" as used herein refers to the standard test method for determining specular gloss of plastic films and solid plastics. In general, this test method describes procedures for the measurement of gloss of plastic films and solid plastics, both opaque and transparent. Specular gloss is used primarily as a measure of the shiny appearance of films and surfaces. Precise comparisons of gloss values are meaningful only when they refer to the same measurement procedure and same general type of material. In particular, gloss values for transparent films should not be compared with those for opaque films, and vice versa. Gloss is a complex attribute of a surface which cannot be completely measured by any single number. Specular gloss usually varies with surface smoothness and flatness. It is sometimes used for comparative measurements of these surface properties. In general, the instrument used in this method shall consist of an incandescent light source furnishing an incident beam, means for locating the surface of the test specimen, and a receptor located to receive the required pyramid of rays reflected by the specimen. The receptor shall be a photosensitive device responding to visible radiation. This test method was approved on Mar. 1, 2008 and published March 2008, the contents of which are incorporated herein by reference in its entirety. For the referenced ASTM standards, visit the ASTM website, www.astm.org, or contact ASTM Customer Service at service@astm.org. The gloss at different angles was determined using a gloss meter with a vacuum plate for fixing the film, on at least 5 pieces of film.

In some embodiments, the polymer composition and/or article made therefrom has a melt flow rate, measured according to ASTM D 1238 with 2.16 kg load at 230° C., ranging from 0.1 to 100 g/10 min. The polymer compositions and/or articles made therefrom may have a melt flow rate, measured according to ASTM D 1238 with 2.16 kg load at 230° C., ranging from 0.1 to 10 g/10 min. The polymer compositions and/or articles made therefrom may have a melt flow rate, measured according to ASTM D 1238 with 2.16 kg load at 230° C., ranging from 0.1 to 5 g/10 min. The polymer compositions and/or articles made therefrom may have a melt flow rate, measured according to ASTM D 1238 with 2.16 kg load at 230° C., ranging from 1.0 to 4 g/10 min. The polymer compositions and/or articles made therefrom may have a melt flow rate, measured according to ASTM D 1238 with 2.16 kg load at 230° C., ranging from 1.1 to 3.0 g/10 min. The polymer compositions and/or articles made therefrom may have a melt flow rate, measured according to ASTM D 1238 with 2.16 kg load at 230° C., ranging from 1.4 to 2.5 g/10 min.

The term "ASTM D 1238" as used herein refers to the standard test method for determining melt flow rates of thermoplastics by extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Feb. 1, 2012 and published March 2012, the contents of which are incorporated herein by reference in its entirety. For the referenced ASTM standards, visit the ASTM website, www.astm.org, or contact ASTM Customer Service at service@astm.org.

In some embodiments, the polymer composition and/or article made therefrom has a drop impact mean failure energy, measured according to ASTM D 2463-95 which is described below, ranging from 10 to 30 J. The polymer composition and/or article made therefrom has a drop impact mean failure energy ranging from 15 to 25 J.

In some embodiments, the polymer composition and/or article made therefrom has heat deflection temperature, measured according to ASTM D 648, ranging from 55 to 75° C.

In some embodiments, the polymer composition and/or article made therefrom has a flexural modulus, measured according to ASTM D 790, ranging from 500 to 1,500 MPa.

ASTM D 790 Standard Test Methods for Flexural Properties of Unreinforced and Reinforced Plastics and Electrical Insulating Materials: The term "ASTM D 790" as used herein refers to the determination of flexural properties by these test methods for quality control and specification purposes. Materials that do not fail by the maximum strain allowed under these test methods (3-point bend) may be more suited to a 4-point bend test. The basic difference between the two test methods is in the location of the maximum bending moment and maximum axial fiber stresses. The maximum axial fiber stresses occur on a line under the loading nose in 3-point bending and over the area between the loading noses in 4-point bending.

In some embodiments, the polymer composition and/or article made therefrom has an Izod impact at 23° C., measured according to ASTM D 256, ranging from 15 to 35 MPa.

ASTM D 256 Standard Test Methods for Determining the Izod Pendulum Impact Resistance of Plastics: The term "ASTM D 256" as used herein refers to the pendulum impact test that indicates the energy to break standard test specimens of specified size under stipulated parameters of specimen mounting, notching, and pendulum velocity-at-impact. Test specimen is held as a vertical cantilevered beam and is impacted by a swinging pendulum. The energy lost by the pendulum is equated with the energy absorbed by the test specimen. For the Notched Izod Impact Strength, the specimen is held as a vertical cantilevered beam and is broken by a pendulum; the impact occurs on the notched side of the specimen.

In some embodiments, the polymer composition and/or article made therefrom has a tensile strength at yield, measured according to ASTM D 638, ranging from 2200 to 5000 psi. In some embodiments, the polymer composition and/or article made therefrom has a tensile strength at break, measured according to ASTM D 638, ranging from 2200 to 5000 psi. In some embodiments, the polymer composition and/or article made therefrom has a tensile elongation at break, measured according to ASTM D 638, ranging from 500 to 2000%. In some embodiments, the polymer composition and/or article made therefrom has a tensile stress at yield at 23° C., measured according to ASTM D 638, ranging from 15 to 35 MPa. In some embodiments, the polymer composition and/or article made therefrom has a tensile strain at yield, measured according to ASTM D 638, ranging from 5 to 20%. In some embodiments, the polymer composition and/or article made therefrom has a tensile strength, measured according to ASTM D 638, ranging from 15 to 35 MPa. In some embodiments, the polymer composition and/or article made therefrom has a tensile strain at break, measured according to ASTM D 638, ranging from 500 to 2000%.

The terms "ISO 527-1" and "ASTM D 638" as used herein refer to the standard test method for determining the tensile properties of unreinforced and reinforced plastics in the form of standard dumbbell-shaped test specimens when tested under defined conditions of pretreatment, temperature, humidity, and testing machine speed. The ASTM D 638 test method and the ISO 527-1 test method are technically equivalent. This test method is designed to produce tensile property data for the control and specification of plastic materials. Tensile properties may vary with specimen preparation and with speed and environment of testing. Consequently, where precise comparative results are desired, these factors must be carefully controlled. It is realized that a material cannot be tested without also testing the method of preparation of that material. Hence, when comparative tests of materials per se are desired, the greatest care must be exercised to ensure that all samples are prepared in exactly the same way, unless the test is to include the effects of sample preparation. Similarly, for referee purposes or comparisons within any given series of specimens, care must be taken to secure the maximum degree of uniformity in details of preparation, treatment, and handling. This test method was approved on May 15, 2010 and published June 2010, the contents of which are incorporated herein by reference in its entirety. For the referenced ASTM standards, visit the ASTM website, www.astm.org, or contact ASTM Customer Service at service@astm.org.

In some embodiments, the polymer composition and/or article made therefrom has a density, measured according to ASTM D 1505, ranging from 0.87 to 0.91 g/cm$^3$.

ASTM D 1505 Standard Test Method for Density of Plastics by the Density-Gradient Technique: The term "ASTM D 1505" as used herein refers to the standard test method for determining density of plastics by the density-gradient technique. In general, this test method is based on observing the level to which a test specimen sinks in a liquid column exhibiting a density gradient, in comparison with standards of known density. This test method was approved on Jul. 1, 2010 and published September 2010, the contents of which are incorporated herein by reference in its entirety. For the referenced ASTM standards, visit the ASTM website, www.astm.org, or contact ASTM Customer Service at service@astm.org. Throughout the present description and claims, all the density values are measured according to ASTM D 1505.

In some embodiments, the polymer composition and/or article made therefrom has a vicat softening temperature ranging from 100 to 130° C. In some embodiments, the polymer composition and/or article made therefrom has a melting temperature from 130 to 170° C. In some embodiments, the polymer composition and/or article made therefrom has a crystallization temperature from 100 to 170° C. In some embodiments, the polymer composition and/or article made therefrom has a xylene soluble content ranging from 0 to 10%. In some embodiments, the polymer composition and/or article made therefrom has a xylene insoluble content ranging from 90 to 100%.

Solubility in Xylene: Determined as follows: 2.5 g of polymer and 250 ml of xylene are introduced in a glass flask equipped with a refrigerator and a magnetic stirrer. The temperature is increased over a period of 30 minutes until the temperature reaches the boiling point of the solvent. The resulting clear solution is then kept under reflux and stirring for an additional 30 minutes. The closed flask is then kept for 30 minutes in a bath of ice and water and in thermostatic water bath at 25° C. for 30 minutes as well. The so formed solid is filtered on quick filtering paper. 100 ml of the filtered liquid is poured in a previously weighed aluminum container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

End Use Articles

The propylene terpolymers and blends thereof described herein are useful in applications known to one skilled in the art, such as forming operations (e.g., film, sheet, pipe and fiber extrusion and co-extrusion as well as blow molding, injection molding and rotary molding) and laminations, and thermoformed sheets and products. Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheets, such as thermoformed sheets (including profiles and plastic corrugated cardboard), geomembranes and pond liners, for example. Molded and blow-molded (including extrusion-blow molded) articles include single and multi-layered constructions in the form of bottles, tanks, large hollow articles, cosmetic containers, food containers and toys, for example, as well as injection molded products, such as housewares, drinking cups, non-food storage containers, filing cabinets and particularly clear drawers as used in such cabinets, general storage devices such as sweater and shoe boxes, and the like. Exemplary injection molded products that may be prepared using the propylene terpolymers of the present invention include housewares, food storage containers, cooking utensils, measuring containers, deli containers and lids, and liquid storage products, such as shampoo, conditioner, and liquid soap containers.

One or more embodiments include forming a clear packaging container from the propylene terpolymers described herein. Any method known to one skilled in the art may be utilized to form such container. For example, and without limitation, the propylene terpolymer may be converted to an intermediate article, referred to as a preform, which may be subsequently converted to an end-use article by way of a variety of processes, including thermoforming or blow-forming.

One or more embodiments include forming a clear packaging container from the propylene terpolymers described herein. Any method known to one skilled in the art may be utilized to form such container, including extrusion and blow molding. For example, the polymer may be converted to an intermediate article, referred to as a preform, which may be subsequently converted to an end-use article via a variety of processes, including thermoforming or injection molding, for example.

End-use articles produced from preforms as disclosed herein have a high gloss retention, meaning that a significant amount of the gloss exhibited by the preform remains after forming the end-use article. The gloss of the preform and end-use article is determined in accordance with ASTM method D 523. The gloss retention upon conversion of a (preform to an end-use article may be calculated according to equation (1)

$$GR(\%) = (Gloss_{end}/Gloss_{pre}) \times 100 \quad (1)$$

where GR is the gloss retention in percent, $Gloss_{end}$ is the gloss of the end-use article and $Gloss_{pre}$ is the gloss of the preform. In one embodiment, end-use articles comprised of the propylene terpolymer compositions of this disclosure have a GR of equal to or greater than about 40%, 50%, 60%, or 70%. In a further embodiment, the GR has an upper limit of about 80%.

End-use articles produced from the propylene terpolymer compositions as disclosed herein have an average haze value (expressed as percent haze) less than about 20%, and more preferably less than about 15%, as determined by ASTM D1003-11. Exemplary average haze values suitable for products produced from the propylene terpolymers described herein include values of equal to or less than about 20%, about 19%, about 18%, about 17%, about 16%, about 15%, about 14%, about 13%, about 12%, about 11%, and about 10%, as determined by ASTM D1003-11. In one embodiment, the articles have an average haze value less than about 12% as determined by ASTM D1003-11. Such articles also exhibit a clarity as determined by the same ASTM standard of 88 or greater. In one embodiment, the articles exhibit a clarity of 90 or greater. In yet another embodiment, the articles exhibit a clarity of 93 or greater. In a further embodiment, the articles exhibit a clarity of 95 or greater.

Further, end use articles produced from the propylene terpolymer compositions as disclosed herein exhibit improved physical, mechanical characteristics, such as Top Load capacities of about 600 Newton (N) or greater, or from about 600 N to about 1000 N. In specific embodiments, the end use articles may have a Top Load capacity of about 610 N or greater, or of about 650 N or greater. In some examples, the end use articles may have an average Drop Impact mean failure energy values of less than about 25 J.

In general, thermoforming processes generally result in a loss of gloss from the polymer to the end-use article. However, the articles exhibiting significantly retained gloss. For example, the packaging container may exhibit a gloss retention of at least about 40%, or at least about 50% or at least about 60%. As used herein, the term "gloss retention" refers to articles wherein a significant amount of the gloss exhibited by a preform remains after forming the end-use article. The gloss of the preform and end-use article is determined in accordance with ASTM method D-523.

In addition, the articles formed via the embodiments described herein, using the propylene terpolymer compositions described, exhibit optical properties, such as haze and gloss, which are significantly improved over those articles formed with previous polymers and catalyst combinations.

EXAMPLES

The following examples are included to demonstrate preferred embodiments of the inventions. It should be appreciated by those of skill in the art that the techniques disclosed in the examples which follow represent techniques discovered by the inventors to function well in the practice of the inventions, and thus can be considered to constitute preferred modes for its practice. However, those of skill in the art should, in light of the present disclosure, appreciate that many changes can be made in the specific embodiments which are disclosed and still obtain a like or similar result without departing from the scope of the inventions.

The following definitions of terms and determination methods apply for the above general description of the invention, as well as to the below examples, unless otherwise defined.

Gloss

Specular gloss properties (inside and outside) were measured at an angle of 60° for the extrusion blow molded (EBM) bottles using a micro-TRI-gloss meter made by BYK-Gardner GmbH in conformance with ASTM D 523 using a black felt backing, and at an angle of 20° for sheet/thermoformed parts. The gloss meter was calibrated using a black glass standard and readings of 92.5 and 95.5 was obtained at angles of 20° and 60°, respectively.

Measurement of MFR $MFR_{2.16}$ (melt flow rate) of the propylene terpolymers as provided herein was measured in g/10 min in accordance with ISO 1133 at a temperature of 230° C. and a load of 2.16 kg, corresponding to International Standard ISO 1133, or ASTM D 1238, condition L (MFR "L").

Ethylene and 1-Butene Content of the Propylene Terpolymers

The ethylene and 1-butene content of the propylene terpolymer compositions of the present invention were determined by I.R. spectroscopy by collecting the IR spectrum of the sample vs. an air background with a Fourier Transform Infrared spectrometer (FTIR). The instrument data acquisition parameters were:
Purge Time: 30 seconds minimum
Collect Time: 3 minutes minimum Apodization: Happ-Genzel
Resolution: 2 cm$^{-1}$.

Sample Preparation: Using a hydraulic press, a thick sheet was obtained by pressing about 1 gram of sample between two aluminum foils. A small portion was cut from this sheet to mold a film of thickness ranging between 0.02 and 0.05 cm (8-20 mils). Pressing conditions were 180±10° C. (356° F.) and about 10 kg/cm$^2$ (142.2 PSI) pressure for about one minute. The pressure was then released, the sample removed from the press and cooled to room temperature. The spectrum of pressed film sample was recorded in absorbance vs. wavenumbers (cm$^{-1}$). The following measurements were used to calculate ethylene and 1-butene content:

Area (At) of the combination absorption bands between 4482 and 3950 cm$^{-1}$ used for spectrometric normalization of film thickness;

Area (AC2) of the absorption band between 750-700 cm$^{-1}$ after two proper consecutive spectroscopic subtractions of an isotactic non-additivated polypropylene spectrum and then of a reference spectrum of an 1-butene-propylene random copolymer in the range 800-690 cm$^{-1}$;

Height (DC4) of the absorption band at 769 cm$^{-1}$ (maximum value), after two proper consecutive spectroscopic subtractions of an isotactic non-additivated polypropylene spectrum and then of a reference spectrum of an ethylene-propylene random copolymer in the range 800-690 cm$^{-1}$.

In order to calculate the ethylene and 1-butene content, calibration straights lines for ethylene and 1-butene obtained by using samples of known amount of ethylene and 1-butene are needed.

Calibration for Ethylene—A calibration straight line is obtained by plotting AC2/At versus ethylene molar percent (% C2m). The slope GC2 is calculated from a linear regression Calibration for 1-Butene—A calibration straight line is obtained by plotting DC4/At versus butene molar percent (% C4m). The slope GC4 is calculated from a linear regression.

The spectra of the unknown samples are recorded and then (At), (AC2) and (DC4) of the unknown sample are calculated. The ethylene content (% molar fraction C2m) of the sample was calculated as follows:

$$\% \ C2m = \frac{1}{G_{C2}} \cdot \frac{A_{C2}}{A_t}$$

The 1-butene content (% molar fraction C4m) of the sample was calculated as follows:

$$\% \ C4m = \frac{1}{G_{C4}} \cdot \left(\frac{A_{C4}}{A_t} - I_{C4}\right)$$

The propylene content (molar fraction C3m) was calculated as follows:

$$C2m = 100 - \%C4m - \%C2m$$

The ethylene, 1-butene contents by weight were calculated as follows:

$$\% \ C2 \ \text{wt} = 100 \cdot \frac{28 \cdot C2m}{(56 \cdot C4m + 42 \cdot C3m + 28 \cdot C2m)}$$

Preparation of the Bottle Specimens

Cylindrical 0.5 L bottles were prepared from the compositions of the examples using an extrusion blow molding (EBM) process, with an extrusion blow molding machine, specifically a W. MÜLLER single-station blowmolder with S1/60 P-PE CoEx 6-layer head. The main process parameters are reported in Table 1.

TABLE 1

| Parameters Used In The Process To Make Bottle Specimen | |
|---|---|
| Manual screw speed (rpm), avg. | 30.5 |
| Load (%) | 35.4 |
| Pressure | — |
| Mold Temperature (° F.) | 65 |
| Parrison Temperature (° F.), avg. | 410 |

The bottles were tested for impact (at 23° C.), haze and top load properties according to the procedures described below.

Haze

Haze was measured on a BYK-Gardner Plus hazemeter in accordance with ASTM Standard Test Method D1003-11, and is reported as an average of 5 readings with standard deviation. Samples (1 mm thick) were obtained from sample containers (EBM bottles detailed below) at a relatively flat point approximately mid-way to the bottom of the bottle after the transition point.

The 1 mm thick samples were conditioned for not less than 40 hours at relative humidity of 50±10% and temperature of 23±2° C. The BYK Gardner Plus spectrophotometer includes a Haze-meter UX-10 and is equipped with a G.E. 1209 lamp and filter C. The instrument calibration was made by carrying out a measurement in the absence of the sample (0% Haze) and a measurement with intercepted light beam (100% Haze). The measurement and computation principle are given in the manner set out in ASTM-D 1003-11. The haze measurement was carried out on five samples and is reported as an average of the 5 readings, with standard deviation as set forth in the ASTM standard.

Top Load on Bottles

Top-load testing was conducted on the EBM bottles in accordance with ASTM-2659-11. For the test, an Instron dynamometer was used, equipped with a balance of 0.2 g accuracy and with a micrometer of 0.01 mm accuracy. After at least 10-hours conditioning at 23±1° C. and 50% relative humidity, the bottle is settled between the two plates of the dynamometer and compressed with a stress velocity of the plate of 5 cm/min. The stress at collapse of the bottle is recorded and the value reported in Newtons (N). The Top Load value is the mean value (with standard deviation) obtained from measurements repeated on 20 bottles.

Drop Impact on Bottles

Impact was measured on the sample bottles filled with water 7/8 full. After conditioning for 2 hours at the temperature of the test (25° C.; 77° F.) the bottles were left falling from increasing heights (up to 280 cm). The parameter reported in the tables is the height at which 50% of the bottles breaks.

A BRUCETON Staircase drop test was conducted in accordance with ASTM D-2463-95 (Procedure B), and is reported as an average of 30 samples, with standard deviation as determined in accordance with the test method. The tests were conducted on filled 0.5 L (500 ml) extrusion blow molded bottles as described below, having a 28 mm neck and body dimensions of 254 mm×127 mm×69.85 mm (height×width×thickness).

The BRUCETON Staircase method according to ASTM D 2463-95 to determine an $F_{50}$ failure height, involves dropping filled bottles a predetermined distance and observing whether the bottle exhibited any delamination. Thirty bottles were used in this test. All 30 bottles were tested from a minimum drop height of 61 cm (24 inches) and passed the test (i.e., no visible delamination), The bottles were then tested from successively higher heights in 300 mm (12 inch) increments. Each bottle was tested once. If the bottle passed, the next bottle was tested from the next higher height. If that bottle passed the next bottle was tested at the next higher height, etc. If a bottle failed the height was reduced for the next bottle, etc. Testing continued up to a height of 213.4 cm (84 inches).

Thickness

The thickness of containers (bottles), such as for purposes of percent haze/thickness ratios, is measured at the point at which the haze has been measured (see below), using a Magna-Mike 8500 Hall effect thickness gauge, and is reported as an average of 5 readings with standard deviation.

Preparation of Sheet Material

Each of the resin compositions were converted to a sheet as the preform and then process further into cups using a thermoformer. Sheet samples were extruded on a Reifenhauser Mirex-W sheet extruder. The extruder has an 80-mm, 33:1 L/D barrier screw with Maddox mixing sections. The sheet die has a symmetrical, coat hanger manifold. The polishing stack was run in an upstack configuration with a polished 3 roll stack. The polished rolls are 16 inches in diameter.

Preparation of Drink Cup Specimens

Preform sheets were produced having a thickness of 1.9 mm and then converted into cups. Portion cups were formed with an Illig RDM 54K thermoformer. The former has longitudinal row control for both upper and lower infrared ceramic heaters. The former conducts solid phase pressure forming with a plug assist made of Hytac-BIX. The forming mold was polished aluminum and trimmed the cups in the forming station. Portion cups 96.6 mm wide (rim diameter) and 139 mm deep were produced from an extruded sheet.

PREPARATION OF THE EXAMPLES

Example 1

Terpolymer Preparation

In a plant operating continuously according to the Spherizone or Catalloy polymerization process, runs were carried out under the conditions specified herein. The polymerization was carried out in the presence of a catalyst system in a series of two or three reactors equipped with devices to transfer the product from one reactor to the next.

Preparation of the Solid Catalyst Component

A Ziegler-Natta catalyst was prepared according to methods known in the art, such as, for example, as described in European Patent EP 07 287 69 B1. Triethylaluminium (TEAL) was used as co-catalyst and dicyclopentyldimethoxysilane as external donor, D-type.

Catalyst System and Prepolymerization Treatment

The solid catalyst component described above was contacted at 12° C. for 24 minutes with aluminium triethyl (TEAL) and dicyclopentyldimethoxysilane (DCPMS) as the outside-electron-donor component. The weight ratio between TEAL and the solid catalyst component and the weight ratio between TEAL and DCPMS are as typical for the preparation of a Ziegler-Natta type catalyst. The catalyst system is then subjected to prepolymerization by maintaining it in suspension in propylene at 20° C. for about 5 minutes before introducing it into the first polymerization reactor.

Polymerization

The polymerization to form the propylene terpolymer is conducted continuously in a series of two reactors equipped with devices to transfer the product from one reactor to the one immediately next to it. Temperature and pressure are maintained constant throughout the course of the reaction. Hydrogen is used as molecular weight regulator. The gas phase (propylene, 1-butene, ethylene and hydrogen) is continuously analyzed via gas-chromatography. At the end of the run the product powder is deactivated with steam and dried under a nitrogen flow.

The data relating to xylene solubles and monomer content in the final terpolymer compositions are obtained from measurements carried out on the so obtained terpolymers, stabilized when necessary. The xylene solubles content at 25° C. ranged between 5 and 8 wt. %.

Then, the propylene terpolymer particles are introduced in an extruder, wherein they are mixed with 1000 ppm of a commercial additive marketed by Ciba Specialty Chemicals Corporation under the name IRGANOX® 168, 500 ppm of Calcium stearate, 500 ppm IRGANOX® 101 (available from Ciba Specialty Chemicals Corporation), 500 ppm of DHT-4A® stabilizer (available from Kisuma Chemicals BV, The Netherlands), and from 100 ppm to 5000 ppm of a clarifying agent marketed by Milliken Chemicals under the name MILLAD® 3988i, NX™ 8000, or NX™ 8500 E. The polymer particles are extruded under nitrogen atmosphere in a screw extruder, under the parameters set forth above.

The data relating to the physical-mechanical properties of the final polymer compositions reported in the tables herein are obtained from measurements carried out on the so extruded polymers and on bottles, films, and thermoformed cups obtained according to the procedures described.

Example 2

EBM Bottle Formulation

Cylindrical 0.5 L bottles were prepared from the compositions of the examples using an extrusion blow molding (EBM) process and a W. MÜLLER blow molder, as detailed above. Select formulations having varied amounts of different clarifying agents are detailed in Table 2. The optical and mechanical characteristics of the formulations are reported in Table 3.

TABLE 2

| Example | Resin | Millad 3988i | Millad NX8000 | Millad NX8500E | HPN-600ei |
|---|---|---|---|---|---|
| 2 | SV261S-A[1] | 0.2 wt. % | — | — | — |
| 3 | SV261S-A | — | 0.2 wt. % | — | — |
| 4 | SV261S-A | — | 0.3 wt. % | — | — |
| 5 | SV261S-B[2] | — | 0.4 wt. % | — | — |
| 7 | T-R[3] | — | — | 0.3 wt. % | — |
| 8 | T-R | — | — | 0.4 wt. % | — |
| 9 | T-R | 0.2 wt. % | — | — | — |
| 10 | T-R | — | 0.2 wt. % | — | — |
| 11 | T-R | — | 0.4 wt. % | — | — |
| 12 | T-R | — | — | — | 0.04 wt. % |
| 13 | T-R | — | — | 0.2 wt. % | — |
| 14 | T-R | — | — | 0.3 wt. % | — |
| 15 | T-R | — | — | 0.4 wt. % | — |
| 16 | T-R[4] | — | — | 2.0 wt. % | — |
| 19 | T-R | — | — | 0.2 wt. % | — |

[1]SV261S-A is the commercial PP random copolymer Pro-Fax SR257M.
[2]SV261S-B is the commercial PP random copolymer RC313H.
[3]T-R is the (C3-C2-C4) terpolymer resin of the invention, with additives as in Example 1.
[4]Terpolymer resin of the invention without any additives besides the clarifying agent.

TABLE 3[1]

| Ex. | % Haze | Clarity | Outside 60° Gloss | Inside 60° Gloss | D-I Failure Energy (J) | Top Load (N) | MFR[3] |
|---|---|---|---|---|---|---|---|
| Control[2] | 5.6 | 97.7 | 125.3 | 128.4 | 14.4 | 815.4 | 1.9 |
| 2 | 13.9 | 87.1 | 80.3 | 94.2 | 26.0 | 722.8 | — |
| 3 | 13.4 | 90.6 | 87.6 | 98.8 | 21.8 | 729.0 | — |
| 4 | 9.4 | 93.3 | 95.9 | 101.7 | 24.9 | 653.9 | — |
| 5 | 7.9 | 91.4 | 96.3 | 102.8 | 21.2 | 702.8 | 1.9 |
| 7 | 13.6 | 97.2 | 109.1 | 110.1 | 21.2 | 715.6 | — |
| 8 | 13.4 | 97.1 | 110.0 | 111.5 | — | 736.3 | — |
| 9 | 8.9 | 92.7 | 105.4 | 108.4 | 30.1 | 597.6 | 2.1 |
| 10 | 8.8 | 93.3 | 106.0 | 108.8 | 21.4 | 626.4 | — |
| 11 | 6.3 | 93.0 | 108.9 | 110.8 | 21.2 | 617.3 | — |
| 12 | 32.3 | 88.1 | 87.8 | 91.5 | 30.4 | 637.3 | — |
| 13 | 11.1 | 97.2 | 107.3 | 108.9 | 20.3 | 651.0 | — |
| 14 | 11.6 | 97.0 | 113.8 | 114.9 | 19.2 | 662.7 | 2.2 |
| 15 | 12.3 | 97.2 | 113.4 | 114.3 | — | 669.5 | — |
| 16 | 12.4 | 90.1 | 90.3 | 97.2 | 32.4 | 524.3 | 1.4 |
| 19 | 25.9 | 92.4 | 96.8 | 99.2 | — | 907.4 | 2.3 |

[1]All values given include a standard deviation (not shown) as determined by, and within the range allowed by, the standard testing method used for each determination.
[2]Control for the study was a discontinued metallocene-based polypropylene (PP) grade product, Pristene RM2091.
[3]Melt Flow Rate, as determined by ASTM D-1238.

The optical and physical property results shown in Table 3 of the EBM bottle prepared from terpolymers in accordance with the present invention indicate that, after the control sample, examples 11 and 14 exhibited the best visual appearance. These terpolymer resin products showed a greater than 10% improvement in % haze, outside 60° gloss and inside 60° gloss as compared to the SV261S resin (a non-terpolymer PP resin; see Table 2). Example No. 14 had the most comparable optical and mechanical results to the control (Pristene RM2091), with a good balance of properties with respect to haze, clarity, and gloss while offering improved drop impact without sacrificing too much Top Load. These bottles also exhibited a less than 10% decrease in Top Load capacity in comparison with products manufactured from this same non-terpolymer resin formulation. Example 19 exhibited the best improvement (greater than 10%) in Top Load capacity, but at the cost of a more than 10% decrease in % haze, with a value of nearly 26%.

Example 3

Thermoform (TF) Cup Formulation

Thermoform cups were formed from terpolymers of the present invention as described above, and the compositions and associated optical and mechanical characteristics are shown in Table 4.

Figure 6:
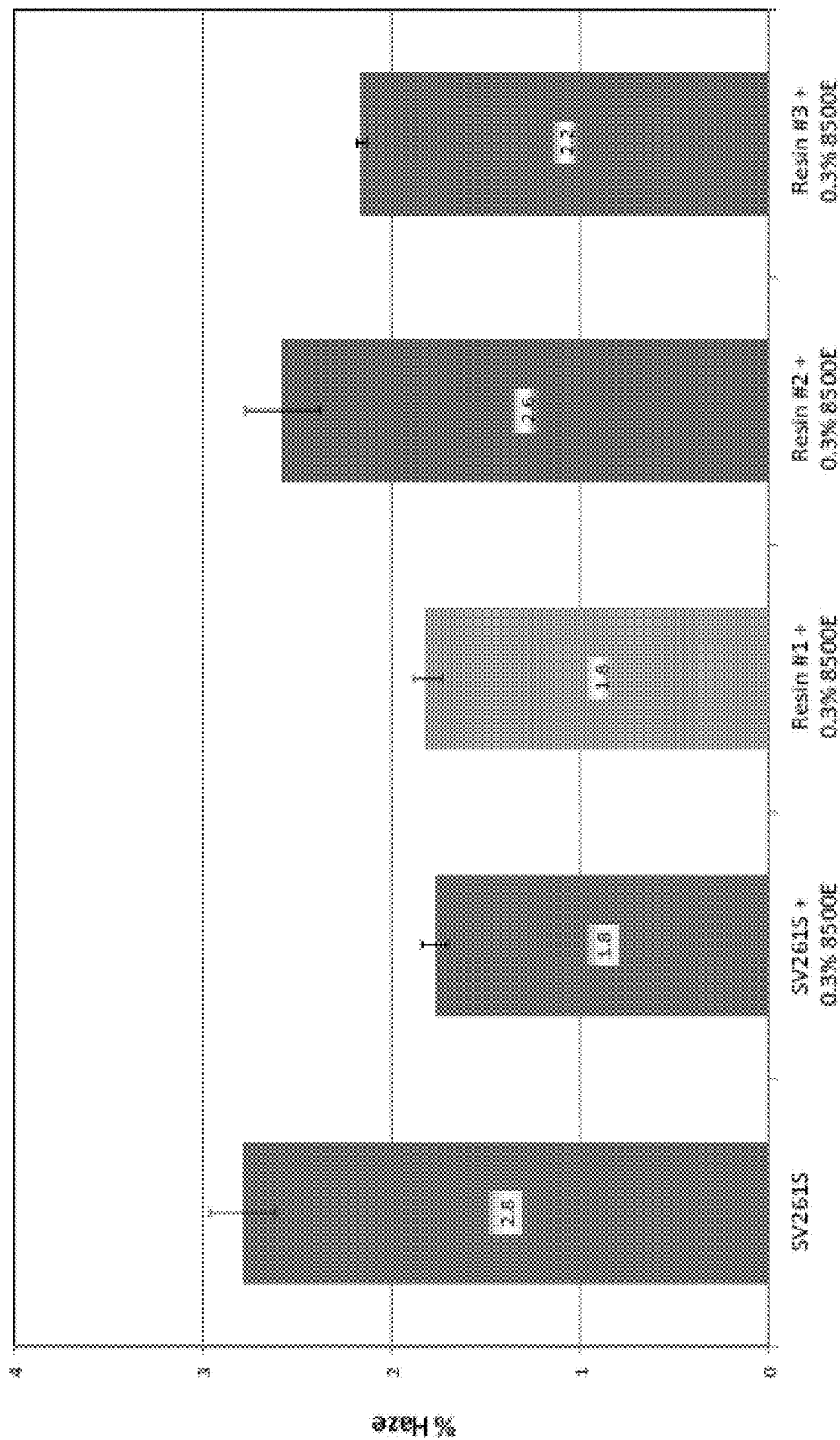
FIG. 6 illustrates the haze of select drink cup articles formed by various clarified terpolymer resin compositions of the present disclosure.
Figure 7:
FIG. 7 illustrates the clarity of select drink cup articles formed by various clarified terpolymer resin compositions of the present disclosure.

The optical properties results of the thermoform (TF) cups made with the 1.9 mm sheet samples are shown in FIGS. 6-7 and Table 4. The propylene terpolymer resin sample including the clarifying agent exhibited an equivalent haze to the control resin with a clarifier, but had an improved clarity (98.4 compared to a clarity of 96.6 for Example 2). The inclusion of an optional additive package exhibited an improvement in both clarity and % haze, as seen by the results of Example 4 compared to the other cup samples. Both Examples 3 and 5 demonstrated improved product clarity with equivalent or comparable haze in comparison to a control (Example 2). The results also demonstrate improved gloss and Top Load for the constructs comprising the sample resins which comprises a terpolymer of the present invention and a nonitol-type clarifier.

TABLE 4

| | Example No. | | | | |
|---|---|---|---|---|---|
| | 1 (Control)[1] | 2 (Control + clarifier) | 3 (NA22BA001)[2] | 4 (ML07MM01)[2] | 5 (LC128A001)[2] |
| IRGANOX ® 1010, wt. % | 0.1 | 0.1 | 0.1 | — | 0.1 |
| IRGAFOS ® 168, wt. % | 0.1 | 0.1 | 0.1 | — | 0.1 |
| CaSt, wt. % | 0.04 | 0.04 | 0.04 | — | 0.04 |
| DHT-4A, wt. % | 0.02 | 0.02 | 0.02 | — | 0.02 |
| Millad ® NX8500E, wt. % | — | 0.3 | 0.3 | 0.3 | 0.3 |

TABLE 4-continued

| | Example No. | | | | |
|---|---|---|---|---|---|
| | 1 (Control)[1] | 2 (Control + clarifier) | 3 (NA22BA001)[2] | 4 (ML07MM01)[2] | 5 (LC128A001)[2] |
| Properties | | | | | |
| Haze, % | 2.8 | 1.8 | 1.8 | 2.6 | 2.2 |
| Clarity | 94.9 | 96.6 | 98.4 | 92.3 | 98.6 |
| Outside gloss, 20° | 83.2 | 107.1 | 112.8 | 76.1 | 104.2 |
| Inside gloss, 20° | 75.5 | 107.5 | 114.9 | 68.0 | 112.0 |
| Top Load, N | 198 | 205 | 188 | 160 | 250 |

[1]The control resin was SV2615, a commercial PP random copolymer.
[2]A terpolymer prepared in accordance with the invention.

Example 4

Extruded Sheet (1.9 mm) Formulation

Extruded 1.9 mm sheets were formed from terpolymers of the present invention as described above, and the compositions and associated optical and mechanical characteristics are shown in Table 5.

TABLE 5

| | Example No. | | | | |
|---|---|---|---|---|---|
| | 1 (Control)[1] | 2 (Control + clarifier) | 3 (NA22BA001) | 4 (ML07MM01) | 5 (LC128A001) |
| IRGANOX ® 1010, wt. % | 0.1 | 0.1 | 0.1 | — | 0.1 |
| IRGAFOS ® 168, wt. % | 0.1 | 0.1 | 0.1 | — | 0.1 |
| CaSt, wt. % | 0.04 | 0.04 | 0.04 | — | 0.04 |
| DHT-4A, wt. % | 0.02 | 0.02 | 0.02 | — | 0.02 |
| Millad ® NX8500E, wt. % | — | 0.3 | 0.3 | 0.3 | 0.3 |
| Properties | | | | | |
| Haze, % | 86.0 | 31.4 | 23.6 | 25.1 | 42.7 |
| Clarity | 21.6 | 95.7 | 98.2 | 91.8 | 97.8 |
| Top gloss, 20° | 75.6 | 96.4 | 108.9 | 93.1 | 92.9 |
| Bottom gloss, 20° | 76.6 | 99.4 | 107.7 | 92.6 | 91.4 |

[1]The control resin was SV2615, a commercial PP random copolymer.

Figure 8:
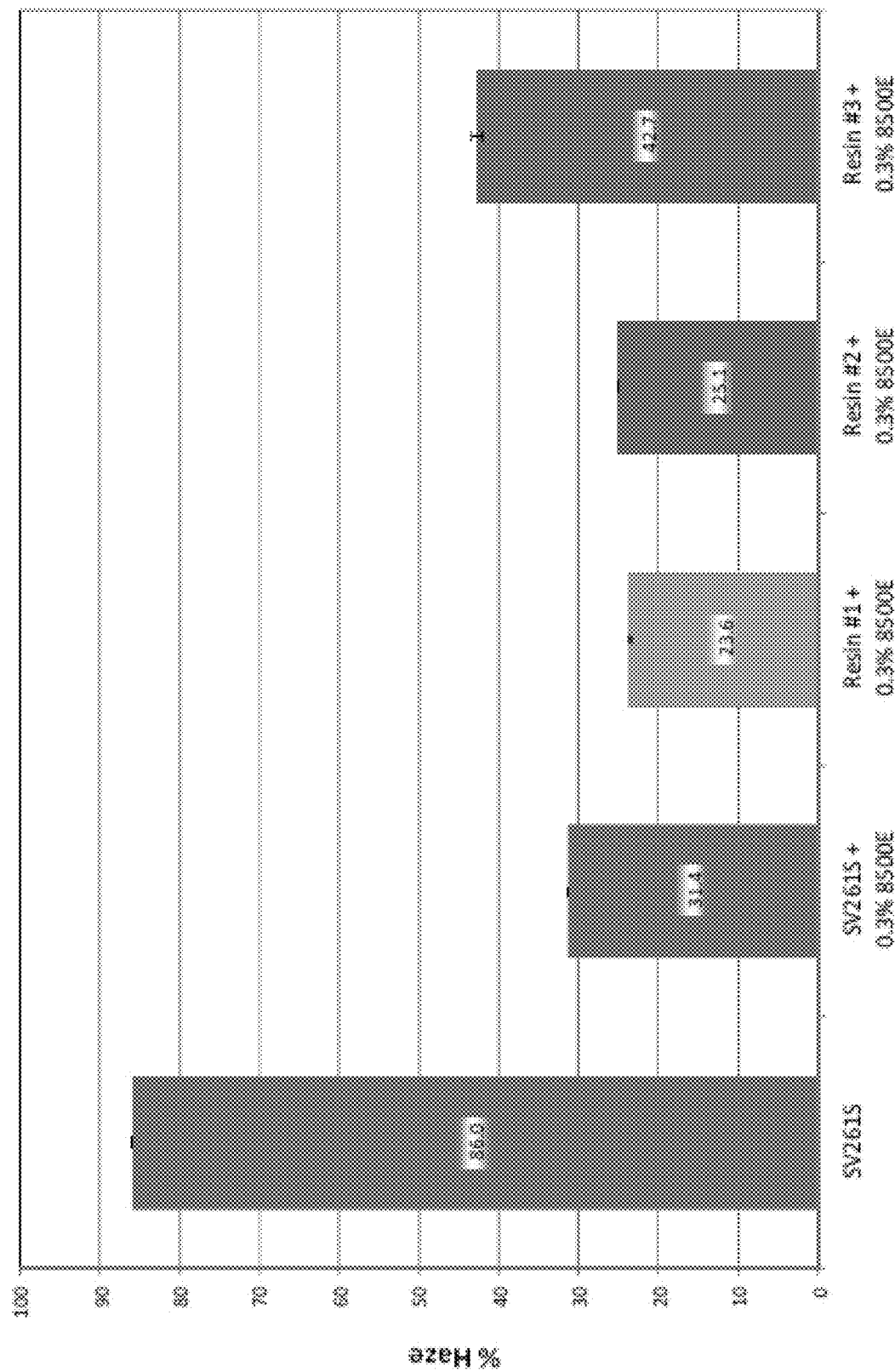
FIG. 8 illustrates the haze of select thin films (TF) formed from various clarified terpolymer resin compositions of the present disclosure.
Figure 9:
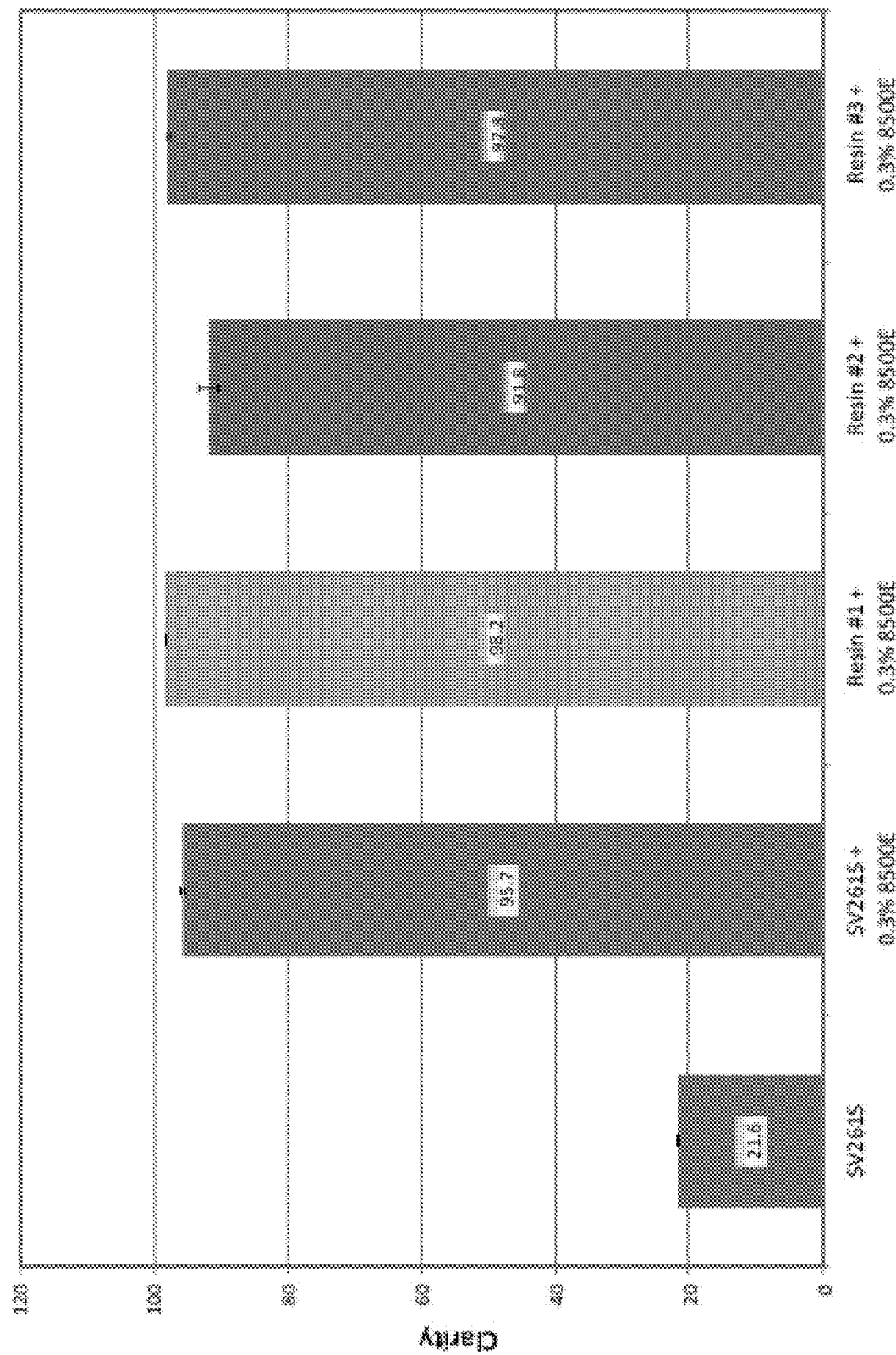
FIG. 9 illustrates the clarity of select thin films (TF) formed from various clarified terpolymer resin compositions of the present disclosure.

The optical properties results of the 1.9-mm sheet samples are given in Table 5, and illustrated graphically in FIGS. 8-9. For this gauge sheet, the propylene terpolymer sample (Example 3) had the lowest haze (23.6%) as compared with the commercially-available product, SV2615, as expected. Even with the addition of a clarifying agent, the commercially-available product (Example 2) exhibited a haze higher than the first two terpolymer resin samples (Examples 2 and 3), with a haze of 31.4% compared to 23.6% and 25.1%, respectively. Example 3 also exhibited the best haze and clarity (98.2) compared to the control. The two terpolymer resin example product sheets Example 3 and Example 4) had equivalent haze performance, and both exhibited clarifies greater than 95. Each of the propylene terpolymer sample sheets (Examples 3-5) had very good clarity and gloss.

Other and further embodiments utilizing one or more aspects of the inventions described above can be devised without departing from the spirit of Applicant's invention. For example, the manner in which the clarified polymer product is prepared may be varied with similar results. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A random propylene terpolymer composition comprising:
   (a) a random propylene terpolymer, wherein the random propylene terpolymer comprises,
      (i) 90.0-96.0 wt. % propylene,
      (ii) 3.0-7.0 wt. % 1-butene, and
      (iii) 1.0-5.0 wt. % ethylene; and
   (b) 0.01-1.0 wt. %, of a nonitol-based compound, with the weight balance of the random propylene terpolymer composition being the random propylene terpolymer and,
   (c) optionally, one or more additives;
   wherein the random propylene terpolymer composition comprises a density of 0.87-0.91 g/cm$^3$.

2. The random propylene terpolymer composition of claim 1, wherein the random propylene terpolymer comprises:
   (i) about 4.0 to about 6.0 wt. % 1-butene derived units, and
   (ii) about 2.0 to about 3.0 wt. % ethylene derived units.

3. The random propylene terpolymer composition of claim 1, wherein the nonitol-based compound concentration is about 0.1 wt. % to about 0.5 wt. % based on the total weight of the random propylene terpolymer composition.

4. The random propylene terpolymer composition of claim 1, wherein nonitol-based compound comprises 1,2,3-trideoxy-4,6:5,7-bis-O-1(4-propylphenyOmethylenel-nonitol or a derivative thereof.

5. The random propylene terpolymer composition of claim 1, wherein the one or more additives are selected from the group consisting of alpha-nucleating agents, thermal stabilizers, extrusion processing aids, ultraviolet light stabilizers, oxidants or anti-oxidants, ant-static agents, slip agents, fire retardants, processing oils, mold release agents, and combinations thereof.

6. The random propylene terpolymer composition of claim 1, wherein the propylene terpolymer composition exhibits a haze according to ASTM D1003-11 equal to or less than about 16%.

7. An article of manufacture comprising the random propylene terpolymer composition of claim 1.

8. The article of manufacture of claim 7, wherein the article is a blow molded article or a thermoformed article.

9. The article of manufacture of claim 8, wherein the article is selected from the group consisting of a bottle, a syringe, and a container for food or medical applications.

10. A method of forming a clear packaging container comprising:
    providing the polymer composition of claim 1;
    (ii) blending the propylene-based terpolymer with a nonitol-based clarifying agent to form a clarified terpolymer; and
    (iii) forming the clarified terpolymer into a packaging container, wherein the packaging container exhibits a haze of less than about 15 percent as measured by ASTM D1003-11 and a clarity of greater than about 90 percent as measured by ASTM D1003-11.

11. The method of claim 10, wherein the clarifying agent comprises 1,2,3-trideoxy-4,6:5,7-bis-O-[(4-propylphenyOmethylene]-nonitol or a derivative thereof.

12. The method of claim 10, wherein the clarified terpolymer comprises form about 1500 ppm to about 4500 ppm clarifying agent.

13. The method of claim 10, wherein the propylene-based terpolymer further comprises one or more additives selected from the group consisting of alpha-nucleating agents, thermal stabilizers, extrusion processing aids, ultraviolet light stabilizers, oxidants or anti-oxidants, ant-static agents, slip agents, fire retardants, processing oils, mold release agents, and combinations thereof.

14. The method of claim 10, wherein the packaging container exhibits an average top load of greater than 600 N.

* * * * *

UNITED STATES PATENT AND TRADEMARK OFFICE
CERTIFICATE OF CORRECTION

PATENT NO. : 11,015,039 B2
APPLICATION NO. : 14/821055
DATED : May 25, 2021
INVENTOR(S) : Montaletti et al.

It is certified that error appears in the above-identified patent and that said Letters Patent is hereby corrected as shown below:

In the Claims

In Column 29, Claim 4, Line 29, delete "O-[(4-propylphenylOmethylene]-nonitol" and insert -- O-[(4-propylphenyl)methylene]-nonitol --, therefor In Column 30, Claim 10, Line 14, after "comprising:" insert -- (i) --

In Column 30, Claim 11, Line 24, delete "O-[(4-propylphenylO-methylene]-nonitol" and insert -- O-[(4-propylphenyl)methylene]-nonitol --, therefor Signed and Sealed this
Twenty-fourth Day of January, 2023

Katherine Kelly Vidal
*Director of the United States Patent and Trademark Office*